United States Patent [19]
Nakamura et al.

[11] Patent Number: 6,066,921
[45] Date of Patent: May 23, 2000

[54] DISCHARGE LAMP LIGHTING DEVICE

[75] Inventors: Toshiaki Nakamura, Hirakata; Nobuo Kato, Settsu; Hideki Hamada, Katano; Ryosuke Maruyama, Hirakata, all of Japan

[73] Assignee: Matsushita Electric Works, Ltd., Osaka, Japan

[21] Appl. No.: 08/727,629

[22] PCT Filed: Feb. 28, 1996

[86] PCT No.: PCT/JP96/00468

§ 371 Date: Jan. 29, 1997

§ 102(e) Date: Jan. 29, 1997

[87] PCT Pub. No.: WO96/27277

PCT Pub. Date: Sep. 6, 1996

[30] Foreign Application Priority Data

Feb. 28, 1995 [JP] Japan ..................... 7-040420
May 12, 1995 [JP] Japan ..................... 7-114447
May 12, 1995 [JP] Japan ..................... 7-114449

[51] Int. Cl.⁷ .................................. H05B 37/02
[52] U.S. Cl. ............... 315/71; 315/56; 315/291; 362/260
[58] Field of Search ..................... 315/307, 224, 315/71, DIG. 5, 291, 82, 56, 119; 362/260, 263

[56] References Cited

U.S. PATENT DOCUMENTS

| | | | |
|---|---|---|---|
| 4,350,929 | 9/1982 | Katoogi ..................... | 315/49 |
| 4,398,123 | 8/1983 | Tsuchihashi et al. ........ | 315/46 |
| 4,935,668 | 6/1990 | Hansler et al. ............. | 315/82 |
| 5,068,570 | 11/1991 | Oda et al. .................. | 315/128 |
| 5,495,149 | 2/1996 | Hiramatsu et al. .......... | 315/DIG. 7 |
| 5,500,576 | 3/1996 | Russell et al. ............. | 315/DIG. 5 |
| 5,574,335 | 11/1996 | Sun .......................... | 315/DIG. 5 |
| 5,596,247 | 1/1997 | Martich et al. ............. | 315/71 |
| 5,838,109 | 11/1998 | Kobayashi et al. .......... | 315/82 |

FOREIGN PATENT DOCUMENTS

| | | |
|---|---|---|
| 63-231801 | 9/1988 | Japan . |
| 3-179694 | 8/1991 | Japan . |
| 3179609 | 8/1991 | Japan . |
| 4-31201 | 3/1992 | Japan . |
| 4293630 | 10/1992 | Japan . |
| 4370696 | 12/1992 | Japan . |
| 5198203 | 8/1993 | Japan . |

(List continued on next page.)

OTHER PUBLICATIONS

English Language Abstract of JP 3–179694.
English Language Abstract of JP 4–370696.
English Language Abstract of JP 3–179609.
English Language Abstract of JP 5–198203.
English Language Abstract of JP 6–44805.
English Language Abstract of JP 7–114819.
English Language Abstract of JP 7–114805.
English Language Abstract of JP 7–114806.
English Language Abstract of JP 8–64013.
English Abstract of JP H4–293630.

*Primary Examiner*—Don Wong
*Assistant Examiner*—Wilson Lee
*Attorney, Agent, or Firm*—Greenblum & Bernstein P.L.C.

[57] ABSTRACT

A discharge lamp lighting device comprising a lamp socket for connecting the discharge lamp; a stabilizing circuit connected to the power source and outputting a voltage to the lamp socket; a starting circuit connected between the stabilizing circuit and the lamp socket, and activated before the discharge lamp begins discharging to generate a high voltage required to start discharging, and deactivated after discharging begins; and a means for disabling the starting circuit when the discharge lamp is not installed in response to the installation or non-installation of the discharge lamp to the lamp socket. Preferably, the starting circuit is integrated with the lamp socket, thus forming a lamp socket unit comprising a starting circuit.

29 Claims, 23 Drawing Sheets

FOREIGN PATENT DOCUMENTS

| | | |
|---|---|---|
| 5-97097 | 12/1993 | Japan . |
| 5-97098 | 12/1993 | Japan . |
| 6-44805 | 2/1994 | Japan . |
| 7-114805 | 5/1995 | Japan . |
| 7-114806 | 5/1995 | Japan . |
| 7-114819 | 5/1995 | Japan . |
| 7-182902 | 7/1995 | Japan . |
| 8-64013 | 3/1996 | Japan . |

DISCHARGE LAMP LIGHTING DEVICE

FIELD OF THE INVENTION

The present invention relates to a discharge lamp lighting device suitable for use in motor vehicle headlights.

DESCRIPTION OF THE PRIOR ART

Because of their high luminance and ability to be used as point-like sources of light, metal halide lamps and other discharge lamps are being considered for use in motor vehicle headlights. Practical application of such discharge lamps is expected in the near future.

Current discharge lamp lighting devices are basically constructed as shown in FIG. 33, i.e., having a socket 54, which is connected by means of a high voltage harness 53 to the igniter 52, into which is plugged the base 56 of the discharge lamp 55. When this discharge lamp 55 is used as a vehicle headlight as shown in FIG. 34, said socket 54 is fixed at the center of a reflector 58 supported inside light unit 57. The igniter 52 is fixed at the inside (top) of the bottom wall of the light unit 57, an inverter 59 is further fixed at the outside (bottom) of the bottom wall of the light unit 57, and the igniter 52 and inverter 59 are connected by means of a high voltage harness 60.

As shown in FIG. 33, the socket 54 comprises an outside electrode 54a and a center electrode 54b. When the discharge lamp 55 is plugged into the socket 54, said outside electrode 54a contacts the outside electrode 56a formed as part of the base 56, and the center electrode 54b similarly contacts the center electrode 56b of the base 56. The discharge lamp 55 can thus be caused to discharge and light by applying to the discharge lamp 55 the high voltage pulse, typically approximately several ten kilovolts, generated by the pulse transformer 61 contained in the igniter 52.

If the power is turned on while the discharge lamp 55 is not installed with this configuration, the high voltage pulse generated by the igniter 52 is discharged between the center electrode 54b and the outside electrode 54a of the socket 54, thus possibly damaging the socket or resulting even in injury.

To resolve this problem it was proposed in, for example, Japanese patent tokkai H4-293630 (1992-293630) to provide an interlock function. While this specific patent does not describe a socket-type discharge lamp unit, the interlock function detects whether a discharge lamp is installed to the headlight unit by means of the socket securing the discharge lamp in the headlight unit contacting the discharge lamp socket of the headlight unit, and stopping the high voltage output when the discharge lamp is not installed.

The problem with this method is that a switching function must be provided in the headlight unit or mounting socket of this discharge lamp lighting device.

DISCLOSURE OF THE INVENTION

Therefore, an object of the present invention is to provide a discharge lamp lighting device whereby applying a high voltage to the headlight unit can be prevented when the discharge lamp is not connected without modifying the headlight unit or other members.

A further object of the invention is to provide a discharge lamp lighting unit suitable for use as a vehicular headlight unit while achieving a compact discharge lamp lighting device module achieving the aforementioned object.

To achieve these objects, a discharge lamp lighting device according to the present invention comprises a lamp socket for connecting a discharge lamp; a stabilizing circuit connected to a power source and outputting a voltage to the lamp socket; a starting circuit connected between the stabilizing circuit and the lamp socket, activated before the discharge lamp begins discharging to generate a high voltage required to start discharging, and deactivated after discharging begins; and a means for deactivating the starting circuit when the discharge lamp is not installed in response to the installation or non-installation of the discharge lamp to the lamp socket. Thus, the starting circuit is not activated unless a discharge lamp is installed to the lamp socket.

When starting the discharge lamp, or more specifically when starting discharge lamp discharging, the stabilizing circuit outputs the high voltage (the first voltage of the Claims) required to activate the starting circuit; after discharging starts, the stabilizing circuit outputs a second voltage that is lower than the first voltage to deactivate the starting circuit and maintain stable discharge lamp discharging. As a result, the starting circuit will not be activated by the deactivating means even if the stabilizing circuit outputs the first voltage unless the discharge lamp is installed to the lamp socket.

It should be noted that "disable" or "deactivate" as used herein means in the broadest sense that the output of the starting circuit is below the high voltage normally required to discharge the discharge lamp, and more specifically means that the voltage actually applied to the starting circuit is a voltage low enough that the starting circuit does not operate, or that connection between the starting circuit and the stabilizing circuit is interrupted.

That this disabling means be assembled as an integral part of the lamp socket is preferable as a means of directly associating the disabling means with the installation or non-installation of the discharge lamp. However, the disabling means may be alternatively disposed on the starting circuit side or between the starting circuit and the lamp socket.

The simplest and most obvious configuration for this disabling means is to provide an auxiliary electrode to the pair of main electrodes of the lamp socket in a manner imparting to these electrodes a switching function that operates in conjunction with the installation and removal of the discharge lamp.

Various combinations are possible between this pair of main electrodes and the auxiliary electrode. It is also possible to associate a high voltage blocking means with the auxiliary electrode such that when the discharge lamp is not installed, the high voltage blocking means prevents the output of the starting circuit from reaching a high voltage.

One object of the present invention can be achieved by housing the lamp socket and igniter, which is the starting circuit of the Claims, in a common housing, thus forming a single unit combining both the lamp socket and starting circuit.

This discharge lamp lighting unit can be mounted directly to the reflector of the discharge lamp or the lamp unit, thereby eliminating the work required to connect the lamp socket and igniter by means of a high voltage harness, and thus greatly simplifying the assembly operation.

This discharge lamp lighting unit preferably comprises the disabling means internally thereto in a configuration whereby voltage discharging between the lamp socket electrodes does not occur when the discharge lamp is not installed.

Said unit can be constructed in various ways, and the arrangement of the lamp socket member, main igniter circuitry, and power transformer forming part of the igniter may be varied as necessary.

BRIEF DESCRIPTION OF THE DRAWINGS

The present invention will become more fully understood from the detailed description given below and the accompanying diagrams wherein.

BEST MODE FOR CARRYING OUT THE INVENTION

Figure 1:
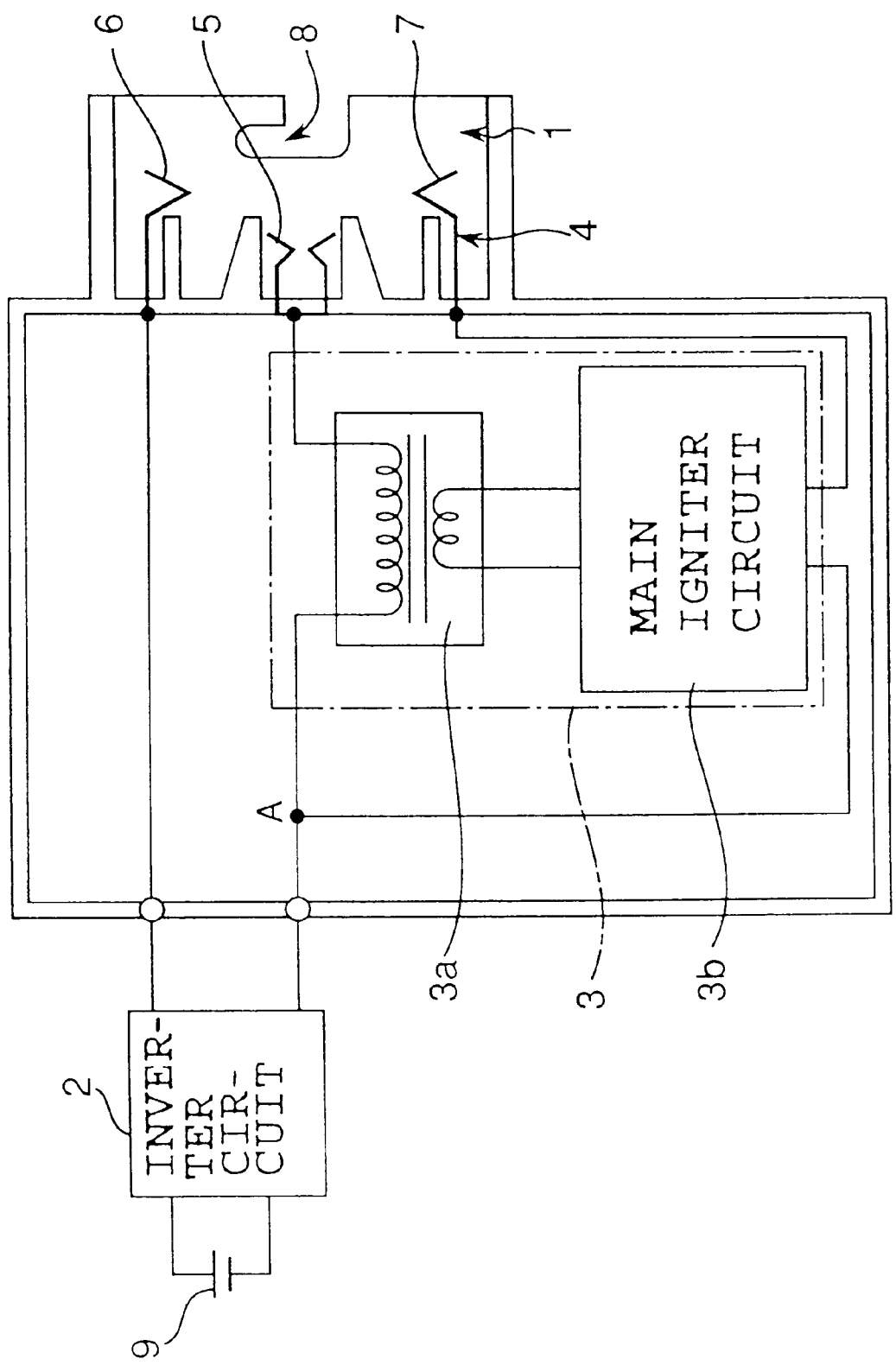
FIG. 1 is a cross sectional diagram of a first embodiment of the present invention.

The first embodiment of a discharge lamp lighting device according to the present invention is described below with reference to FIG. 1. As shown in FIG. 1, this discharge lamp lighting device comprises a lamp socket 1, stabilizing circuit (inverter) 2, starting circuit (igniter) 3, and disabling means 4.

Figure 33:
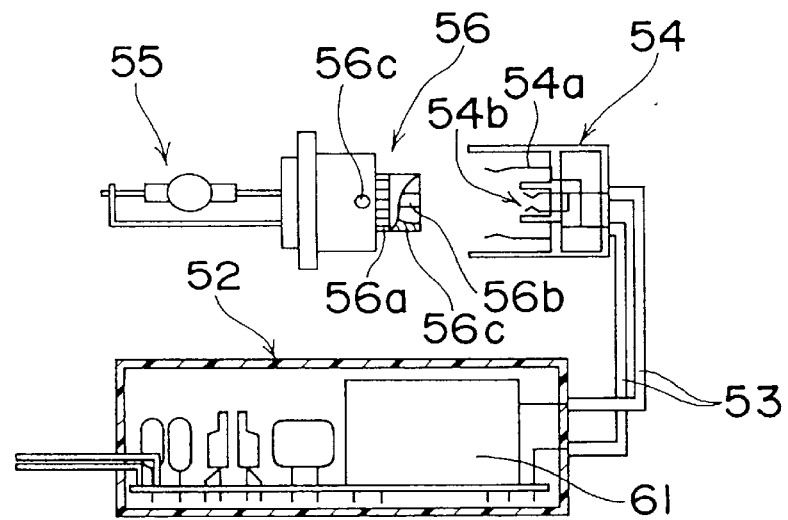
FIG. 33 is used to describe a conventional discharge lamp lighting device.
Figure 34:
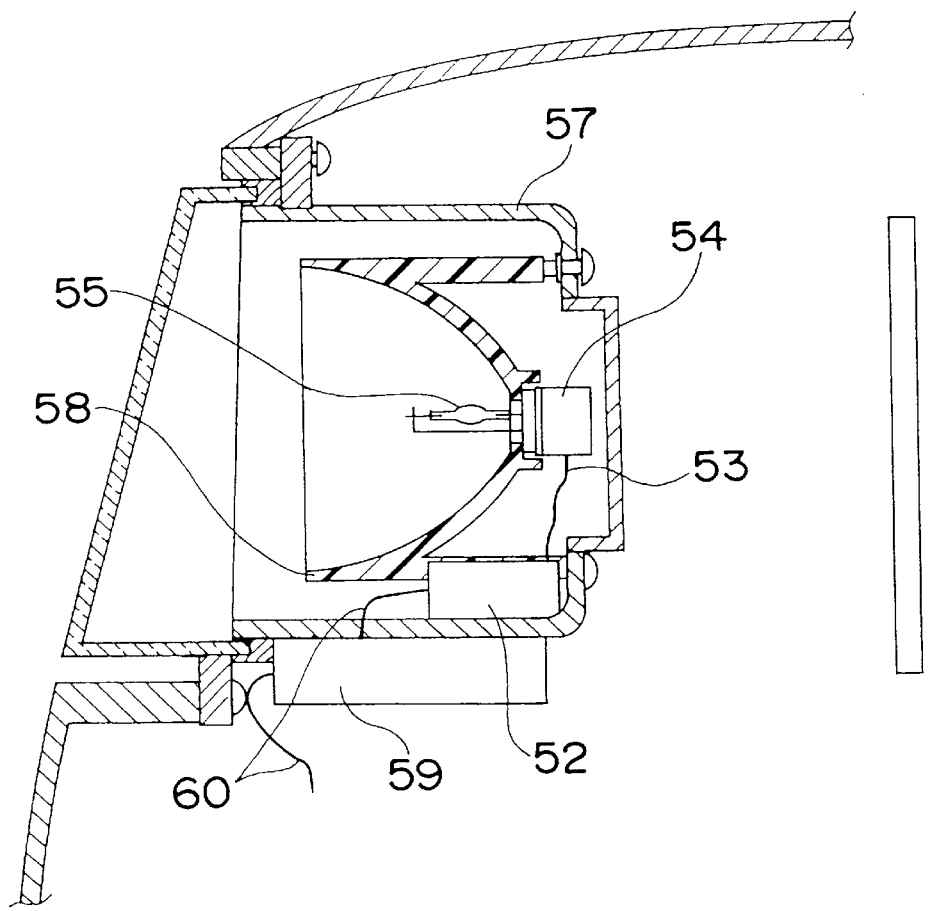
FIG. 34 is a cross section of the conventional discharge lamp lighting device shown in FIG. 33 when assembled into a motor vehicle headlight.

The lamp socket 1 is connected to the discharge lamp (not shown in the figure). The discharge lamp is constructed as shown in FIG. 33. The main electrodes of the lamp socket 1 of the present embodiment are the center electrode 5 contacting the center electrode (56b in FIG. 33) of the discharge lamp base, and the outside electrode 6 contacting the outside electrode (56a in FIG. 33) of the base. The lamp socket 1 further comprises an auxiliary electrode 7 of the same construction as the outside electrode 6 at a position opposite the outside electrode 6 with the center electrode 5 therebetween. The outside electrode 6 and auxiliary electrode 7 are thus isolated so that they are connected by the outside electrode of the base when the base of the discharge lamp is inserted. A notch 8 for holding the discharge lamp is also provided such that the engaging pin (56c in FIG. 33) provided on the outside of the discharge lamp base is engaged by the notch 8 when the discharge lamp base is inserted to the lamp socket 1 and rotated into position. Note, further, that the starting circuit 3 is provided inside the lamp socket 1.

The stabilizing circuit 2 is connected to the lamp socket 1 for stably lighting the discharge lamp. Note that the stabilizing circuit 2 generates a higher voltage to start discharge lamp discharging than during stable discharge lamp output. The present embodiment uses for the stabilizing circuit 2 an inverter circuit of a known design to generate a voltage (first voltage) of, for example, several hundred volts during discharge lamp starting. The input terminal is connected to a battery 9 as the power supply, and the output terminal is connected to the center electrode 5 and outside electrode 6 of the lamp socket 1 via the starting circuit 3.

The starting circuit 3 operates at a voltage greater than the operating voltage, which is a voltage less than the discharge lamp starting voltage of the stabilizing circuit 2, and is connected to the lamp socket 1 to start the discharge lamp discharging from the off state. In this embodiment, the starting circuit 3 is an igniter circuit provided inside the lamp socket 1 and comprising a main igniter circuit 3b and a high voltage transformer 3a that operates when the input voltage is greater than the operating voltage. One input terminal to the main igniter circuit 3b is connected by contact A to the output line connected to one output terminal of the stabilizing circuit 2 inside the lamp socket 1; the other input terminal is connected to the auxiliary electrode 7. The output terminal of the starting circuit 3 is connected between contact A and center electrode 5.

The disabling means 4 is also provided inside the lamp socket 1 for dropping the input voltage to the starting circuit 3 below the operating voltage of the starting circuit 3 when the discharge lamp is not installed. In this example the disabling means 4 is achieved by means of the auxiliary electrode 7 provided inside the lamp socket 1 and connected to one input part of the starting circuit 3, and is connected to the outside electrode 6, which is one of the main electrodes, via the outside electrode shared as part of the electrically conductive part of the discharge lamp when the discharge lamp is installed.

Note that in FIG. 1 and the following figures shading is omitted for easier identification of the electrodes in the cross sections of the lamp socket 1 and the casing of the starting circuit 3 (igniter).

The circuitry and operation of the first embodiment shown in FIG. 1 is described in detail below with reference to FIG. 2.

Figure 2:
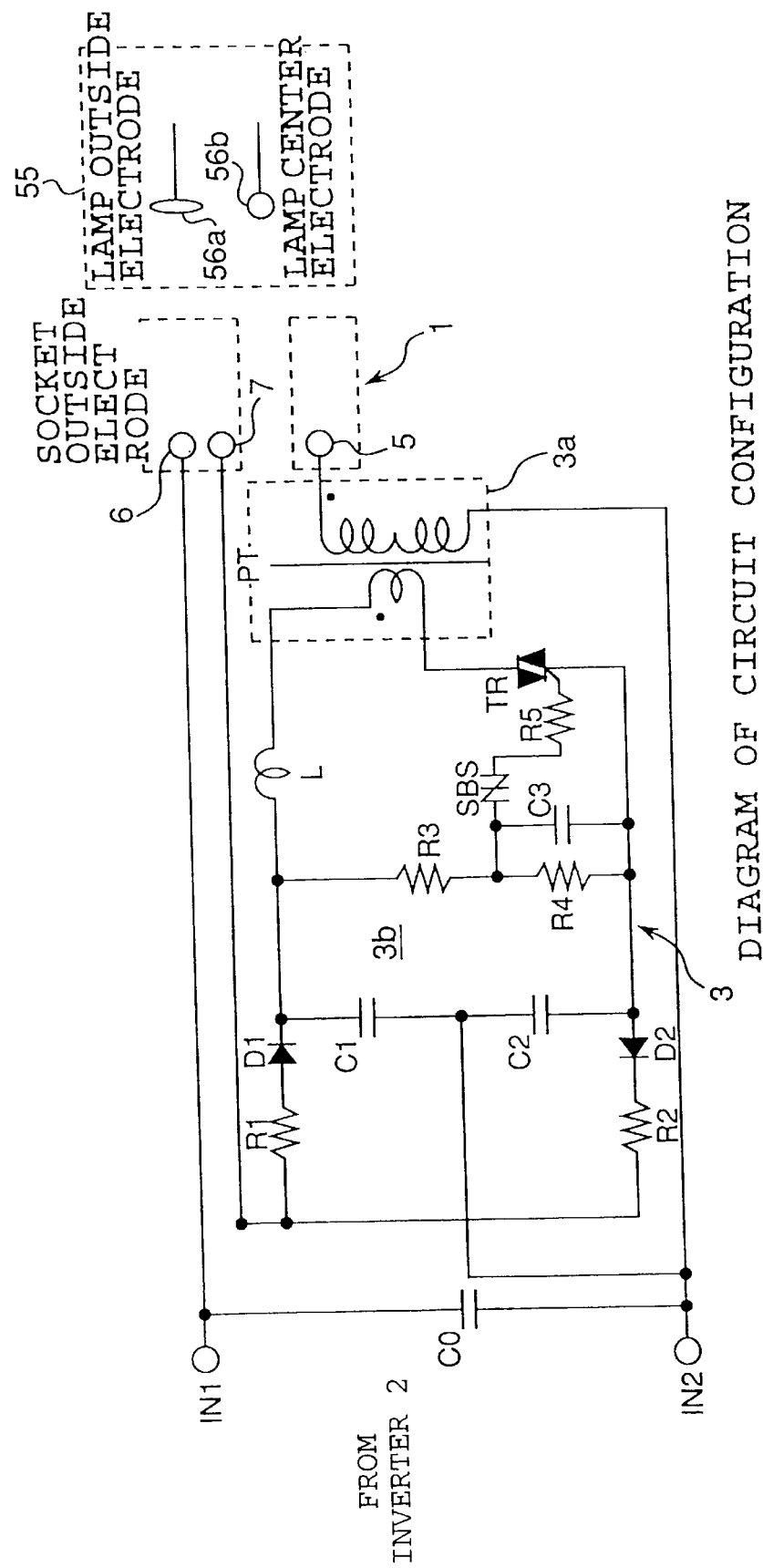
FIG. 2 is a circuit diagram used to describe the circuit configuration of the first embodiment of the invention.

As shown schematically in FIG. 2, conductive connection does not exist between the outside electrode 6 functioning as the main electrode connected to the one output terminal IN1 of the inverter 2, and the outside electrode 7 functioning as the auxiliary electrode connected to the other input terminal of the main igniter circuit 3b, when the discharge lamp 55 is not installed to the lamp socket 1.

When the discharge lamp 55 is then installed to the lamp socket 1, conductive connection is established between the outside main electrode 6 and the auxiliary electrode 7 by the outside electrode 56a of the lamp, thus connecting both input terminals to the main igniter circuit 3b to the output terminals IN1 and IN2 of the inverter (stabilizing circuit) 2.

The circuit design of the igniter 3 used as the starting circuit is, as shown in FIG. 2, not unique to the present invention.

If the power supply to the inverter 2 is turned on with the discharge lamp 55 installed to the lamp socket 1, the inverter 2 outputs a first voltage square wave of several hundred volts to the igniter 3. When this square wave is applied to the igniter 3, current flows to the primary side of the high voltage transformer 3a, thus generating a high voltage of several ten kilovolts at the secondary side. This high voltage is applied to the discharge lamp 55 through the center electrode 5 of the socket, which contacts the center electrode 56b of the lamp. The high voltage applied to the discharge lamp 55 starts discharging the discharge lamp, and continues until the lamp lights stably.

Figure 3:
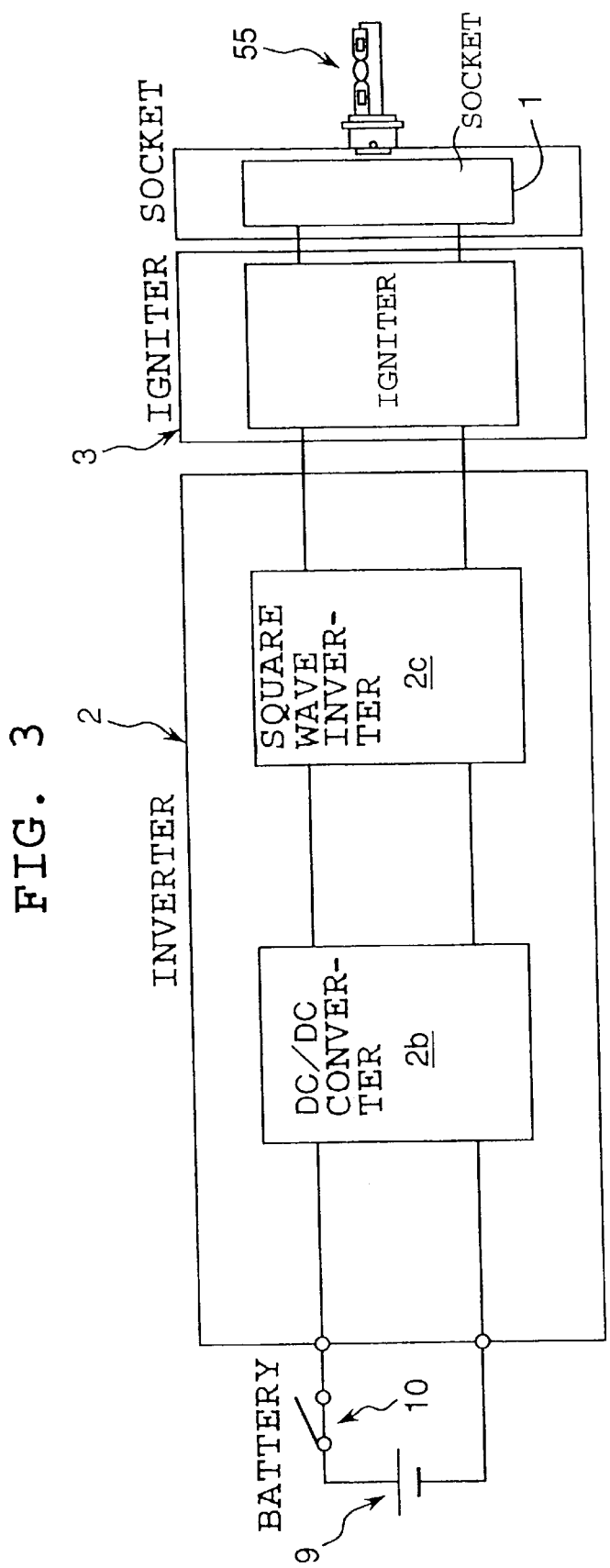
FIG. 3 is a block diagram of the electrical circuitry suited to a discharge lamp lighting device according to the present invention.

As shown in the block diagram of the discharge lamp lighting control circuit in FIG. 3, the inverter 2 comprises a square wave inverter 2c for square wave conversion, and a DC/DC converter 2b connected through the light switch 10 to the power supply battery 9.

When the several hundred volts (first voltage) applied by the inverter 2 causes the igniter 3 to start operating, and a pulse voltage of several hundred kilovolts is applied to the discharge lamp 55 to start the discharge lamp 55 discharging, the inverter 2 shifts to a constant power operation mode. The voltage output in this constant power operation mode is the second voltage, which is a voltage of approximately 90 V. This second voltage holds the igniter 3 in a deactivated state, and a high pulse voltage is therefore not output.

When the discharge lamp 55 is not installed to the lamp socket 1, the input terminal to the main igniter circuit 3b of the starting circuit 3 is below the operating voltage and power is not supplied. The high voltage is therefore not output, and the discharge lamp can be safely replaced.

Note that the present embodiment provides in the lamp socket 1 a disabling means 4 whereby the output voltage of the inverter 2 is held below the voltage at which the igniter 3 operates when the discharge lamp 55 is not installed. As a result, a high voltage is not output when the discharge lamp 55 is not installed, thereby preventing damage to the lamp socket 1 and other accidents.

It is also not necessary to modify the light or stabilizing circuit (igniter) because an interlock function is built into the lamp socket 1 in the shape of the disabling means 4.

A high self-healing characteristic can also be expected even if an oxidation film forms on the surface of each electrode in the lamp socket 1 because of the relatively high voltage applied to each electrode (e.g., the 300-V initial voltage when the lamp is off).

Figure 4:
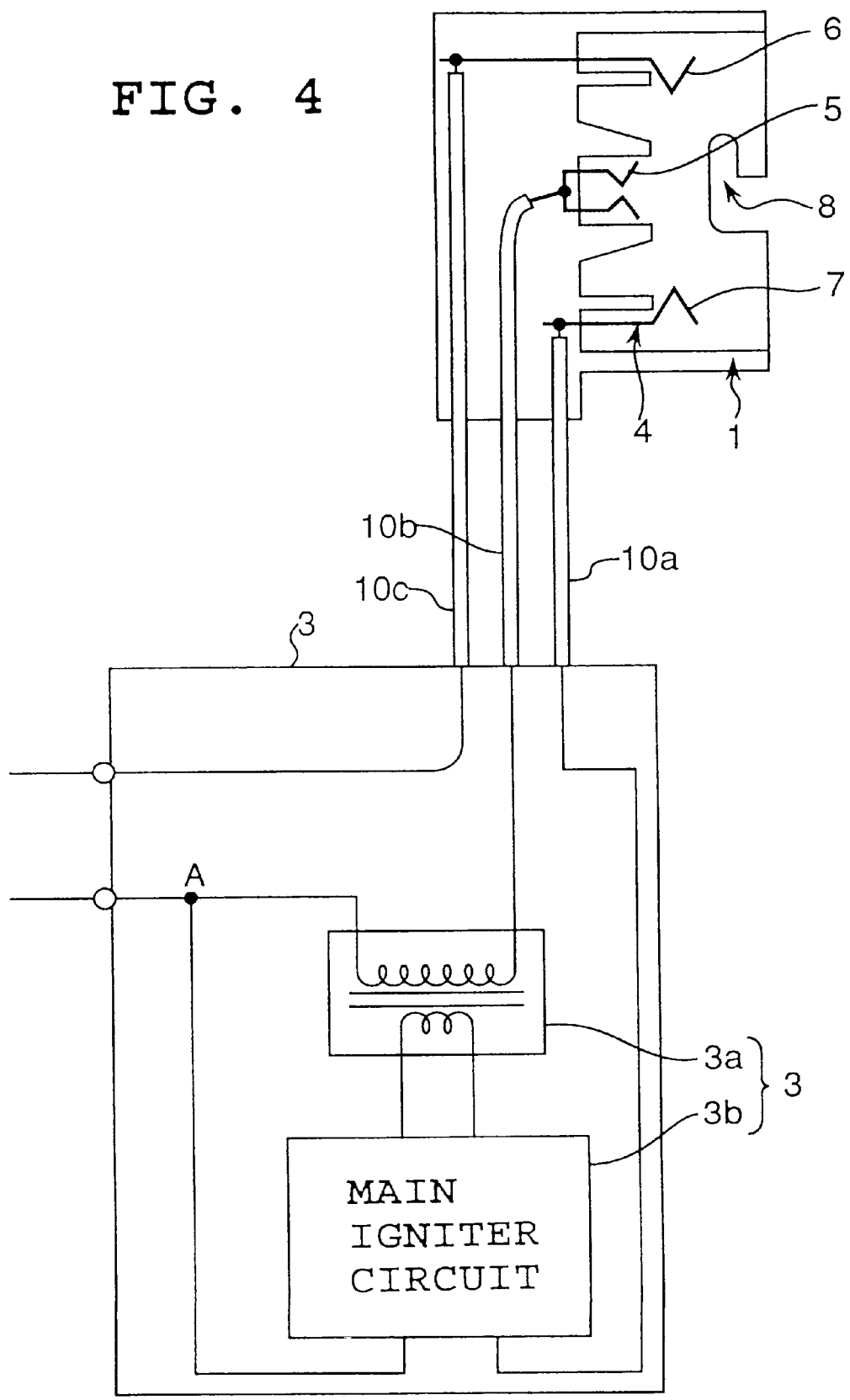
FIG. 4 is a diagram used to describe the second embodiment of the invention.

The second embodiment of the present invention is shown in FIG. 4 and described next below. This embodiment differs from the first in that the lamp socket 1 and starting circuit 3 are physically separated while electrically connected by means of three leads 10a–10c.

Figure 5:
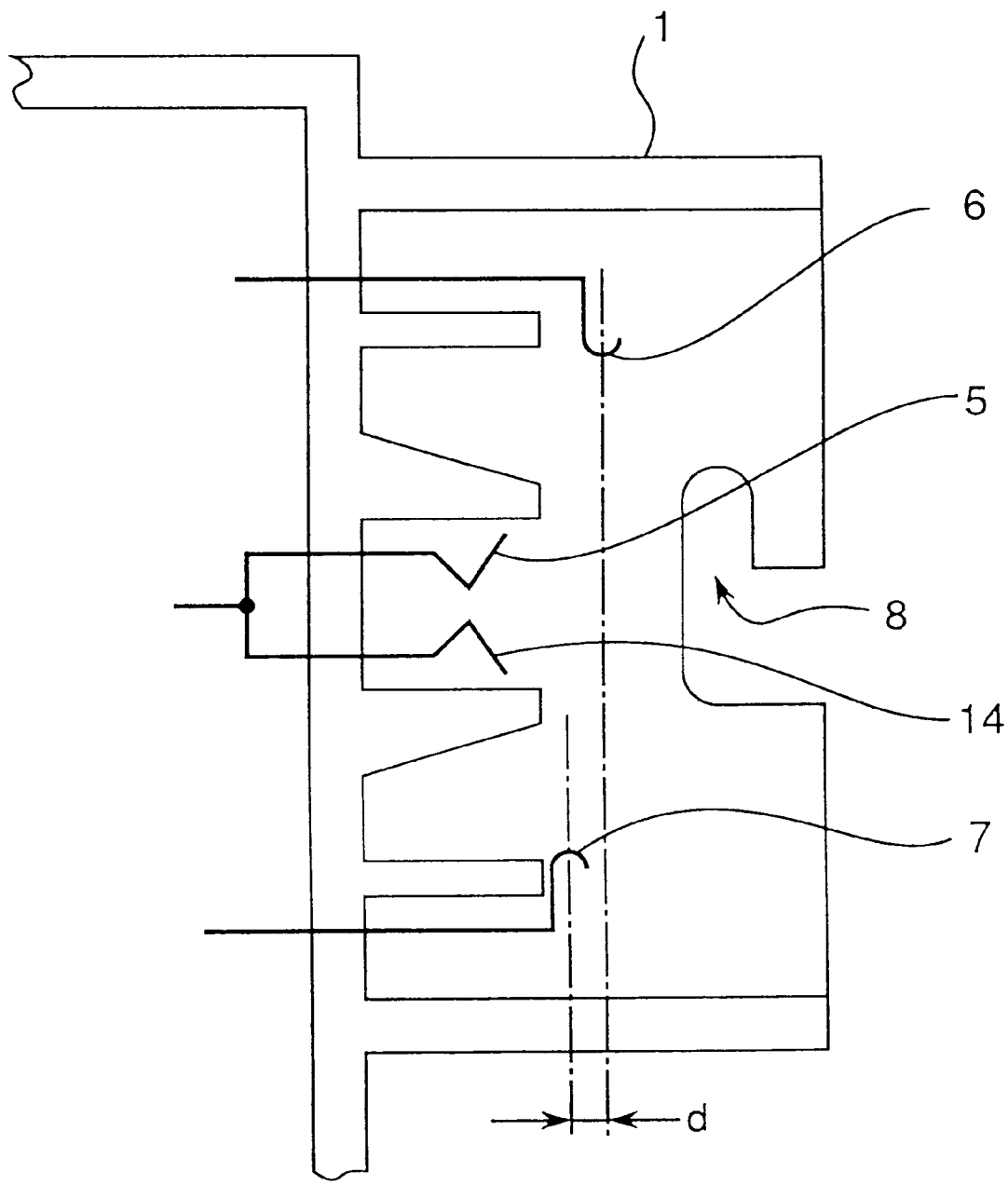
FIG. 5 is a figure of an alternative embodiment of the first and second embodiments of the invention.

The preferred embodiment of the electrodes of the lamp socket 1 in this embodiment is shown in FIG. 5. Specifically, the contact point between the auxiliary electrode 7 and the outside electrode of the base is offset in this second embodiment by distance d to the inside of the lamp socket 1 from the contact point between the outside electrode 6 and the outside electrode of the base.

In this case, the center electrode 5 is disposed to contact the center electrode of the base when the discharge lamp is installed to the position where the outside electrode 6 contacts the outside electrode of the base, while the auxiliary electrode 7 is disposed such that both the outside electrode 6 and the auxiliary electrode 7 contact the outside electrode of the base when the discharge lamp 55 is fully inserted to the lamp socket 1.

With this configuration, if the discharge lamp 55 is partially removed from the lamp socket 1, the auxiliary electrode 7 loses contact with the outside electrode of the base, and the starting circuit operation becomes unstable, damage or accidents caused by discharging through the electrodes of the lamp socket 1 or applying a high voltage to the input part of the starting circuit 3 can be prevented because the outside electrode 6 to which the high voltage is applied and the center electrode 5 are positively connected to the discharge lamp 55.

Figure 6:
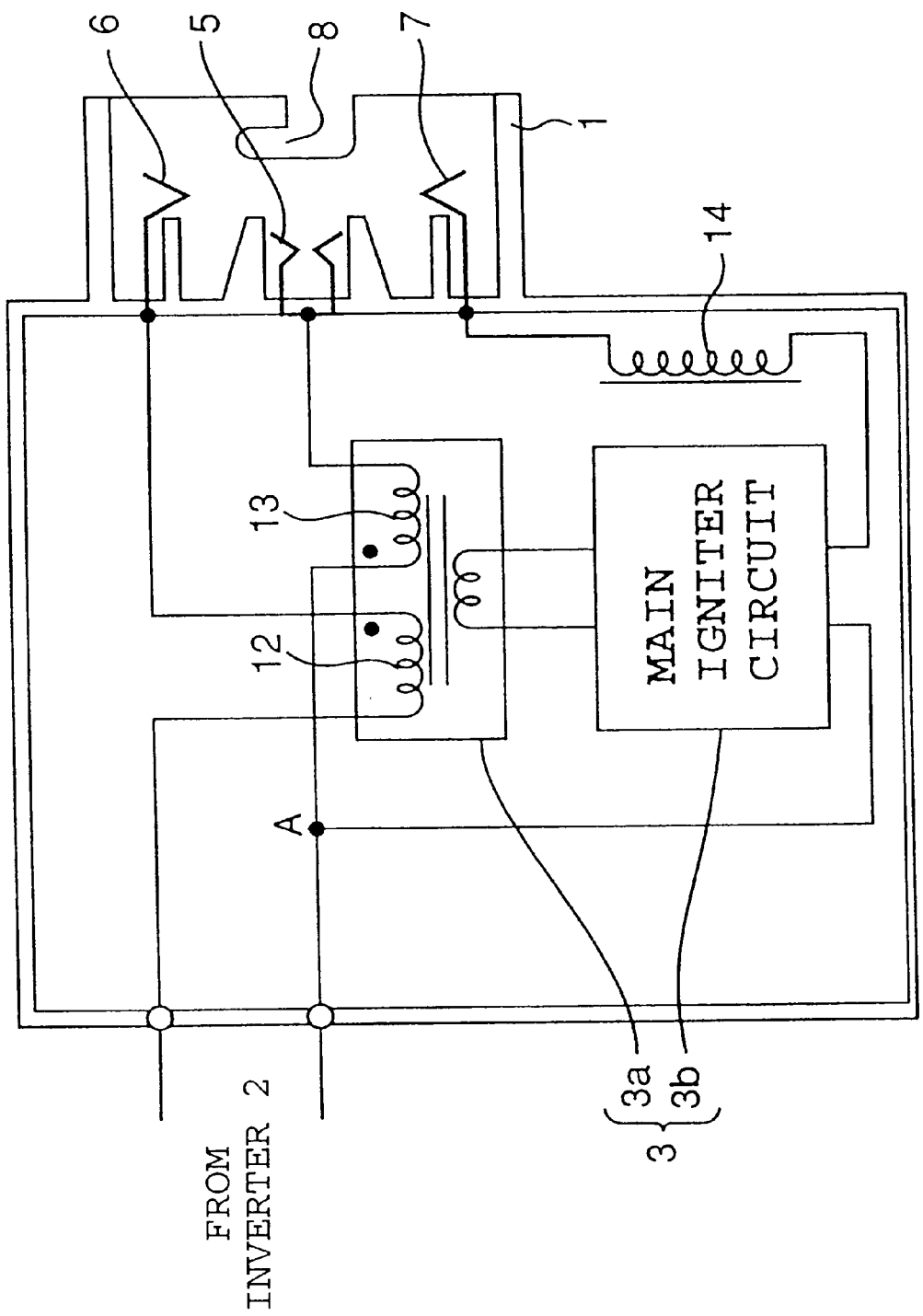
FIG. 6 is a diagram used to describe the third embodiment of the invention.

The third embodiment of the invention is described next with reference to FIG. 6. The discharge lamp lighting device of this embodiment separates the high voltage transformer 3a of the starting circuit (igniter) 3 of the first embodiment into two secondary coils 12 and 13, which are serially connected with consideration given to the polarity of the electrodes such that a positive high voltage is applied to either the center electrode 5 or the outside electrode 6, and a negative high voltage is applied to the other electrode.

Because a high voltage is also applied to the auxiliary electrode 7 with this configuration, a reactor 14 is serially connected to the auxiliary electrode 7 to prevent a high voltage from being applied to the power supply input terminal of the main igniter circuit 3b.

Figure 7:
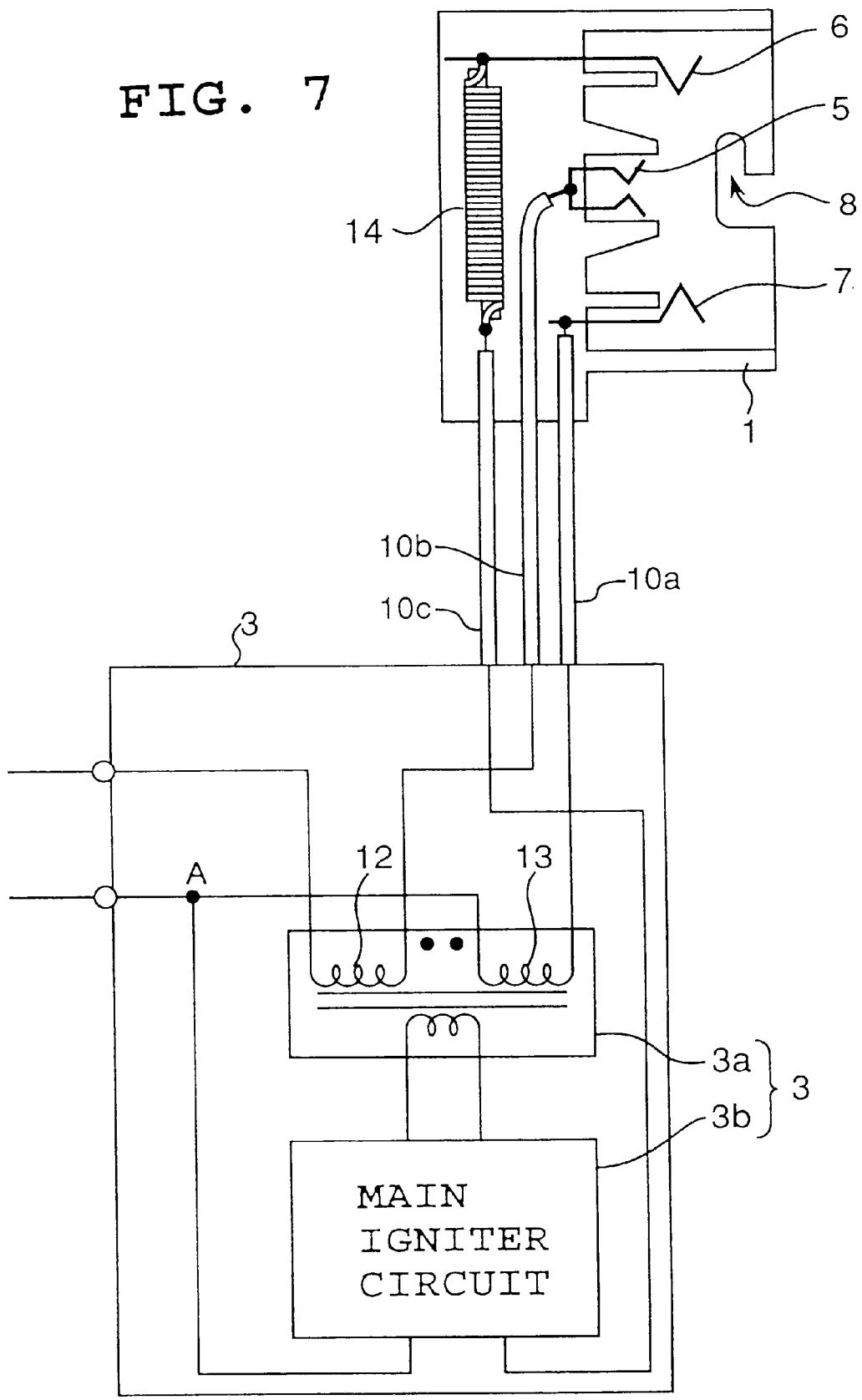
FIG. 7 is a diagram used to describe the fourth embodiment of the invention.

The fourth embodiment of the invention is described next with reference to FIG. 7. This embodiment differs from the third in that the starting circuit 3 is physically separated from the lamp socket 1. By thus incorporating this high voltage blocking reactor 14 inside the lamp socket 1, a low voltage lead 10c can be used between the reactor 14 and the starting circuit 3.

Figure 8:
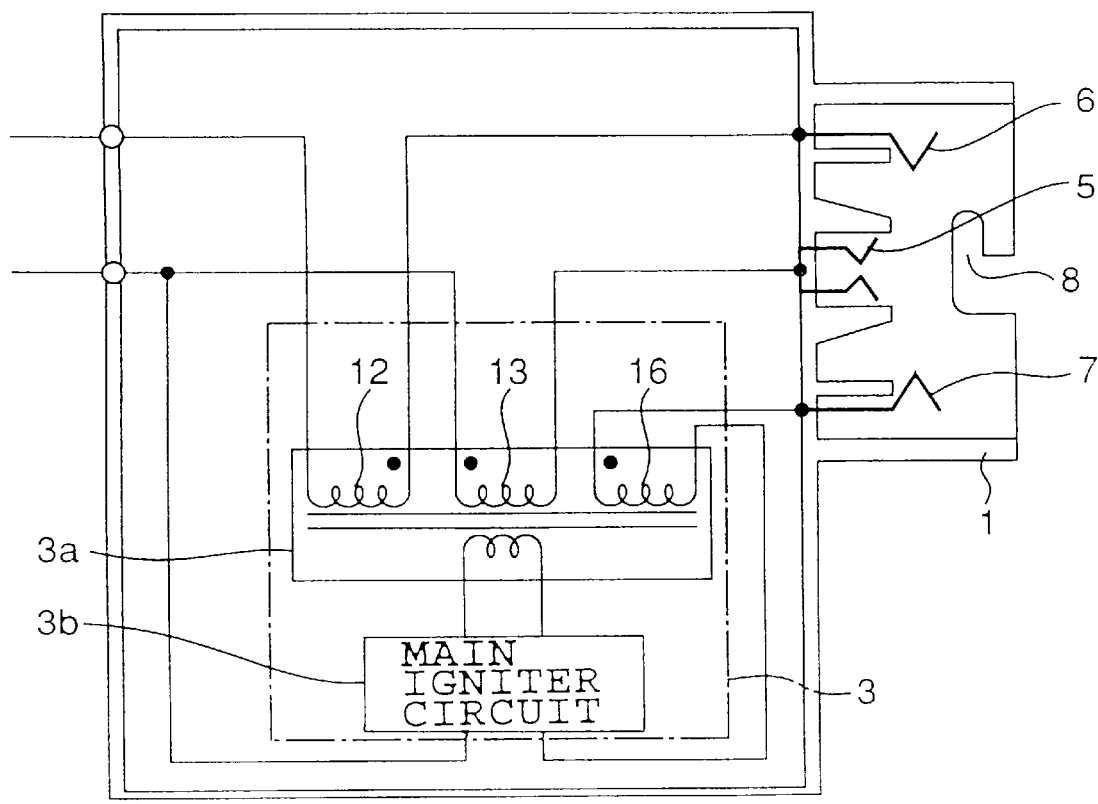
FIG. 8 is a diagram used to describe the fifth embodiment of the invention.

The fifth embodiment of the invention is described next with reference to FIG. 8. This embodiment differs from the third in that a secondary coil 16 generating a high voltage approximately equal to the voltage generated by the secondary coil 12 connected to the outside electrode 6 is provided in place of the reactor 14 such that a voltage of the same polarity as the voltage appearing at the outside electrode 6 is applied to the auxiliary electrode 7. It is therefore possible to cancel the high voltage applied to the auxiliary electrode 7 as in the third embodiment above, and applying a high voltage to the input terminal of the main igniter circuit 3b can thus be prevented.

Figure 9:
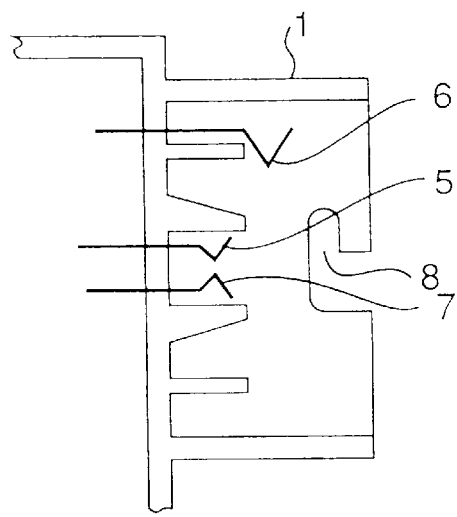
FIG. 9 is a figure of an alternative embodiment of the fifth embodiment of the invention.

The sixth embodiment of the invention is described next with reference to FIG. 9. This embodiment differs from the first in that the auxiliary electrode 7 and center electrode 5 are parallel, and installing the discharge lamp to the lamp socket 1 results in continuity between the auxiliary electrode 7 and center electrode 5 as a result of the auxiliary electrode 7 and center electrode 5 contacting the center electrode of the discharge lamp base. With this configuration the secondary coil of the high voltage transformer 3a of the starting circuit 3 contacts the outside electrode 6 rather than the center electrode 5.

Figure 10:
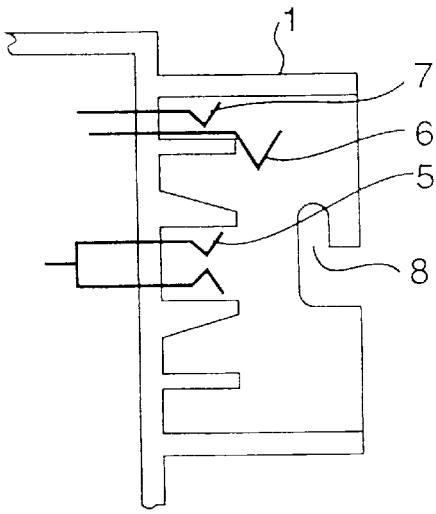
FIG. 10 is a figure used to describe a further alternative embodiment of the invention.

The seventh embodiment of the invention is described next with reference to FIG. 10. This embodiment differs from the first in that the auxiliary electrode 7 is disposed parallel to the outside electrode 6 on the outside thereof in the radial direction of the lamp socket 1. When the base of the discharge lamp is inserted to the lamp socket 1, the outside electrode 6 contacts the outside electrode of the base and is pushed to the outside by the base. This causes the outside electrode 6 to contact the auxiliary electrode 7, thereby enabling power to be supplied to the starting circuit 3.

The eighth embodiment of the invention is described next with reference to FIG. 11 and FIG. 12. In this embodiment the disabling means 4 of the first embodiment lowering the output voltage of the stabilizing circuit 2 to below the output voltage of the starting circuit 3 when the discharge lamp is not installed is provided such that a closed circuit blocking output from the stabilizing circuit 2 is formed when the discharge lamp is not installed to the lamp socket 1, and this closed circuit is opened by installing the discharge lamp.

Specifically, the input terminal to the starting circuit 3 is disposed between the center electrode 5 and outside electrode 6 in this embodiment, and the secondary coil of the high voltage transformer is serially connected between the center electrode 5 and the starting circuit input terminal contact B contacting the center electrode 5. One output terminal of the stabilizing circuit 2 is connected to the starting circuit 3 contact B contacting center electrode 5, and the other output terminal is electrically connected to the outside electrode 6 by means of the leaf spring contacts 24 and 25 of the circuit protector 33. A short bar 17 extends to the center electrode 5, and an auxiliary electrode 7a is provided adjacent to the center electrode 5. This auxiliary electrode 7a contacts the end of the short bar 17 when the discharge lamp is not installed, and is separated from the short bar 17 by the tip of the base pin (see 56c in FIG. 33) when the discharge lamp is installed. The heating wire 21 of the circuit protector 20 connects the outside electrode 6 and the auxiliary electrode 7a. The outside electrode 6 contacts one contact 24 of the circuit protector 20, and one output terminal from the stabilizing circuit 2 is connected to the other contact 25.

When the discharge lamp is not installed, the center electrode 5 and outside electrode 6 are connected with a relatively low impedance (near the short level) because the auxiliary electrode 7a is connected by the heating wire 21 to the outside electrode 6. The voltage between the terminals thus drops sharply to below the operating voltage of the main igniter circuit 3b. The starting circuit 3 therefore does not operate, and a high voltage is not applied to the center electrode 5.

When the discharge lamp is not installed, the output from the stabilizing circuit 2 causes current to flow from the center electrode 5 to the auxiliary electrode 7a, but an overcurrent does not flow because the stabilizing circuit 2 is controlled to not exceed a maximum current value (e.g., 2.6 A). Unless the stabilizing circuit 2 is turned off, however, this current continues to flow, creating a possible cause of damage or accident. As a result, when current flows to the auxiliary electrode 7a, the current flow causes the circuit protector 33 to operate and cut off the output power from the stabilizing circuit 2.

Figure 12:
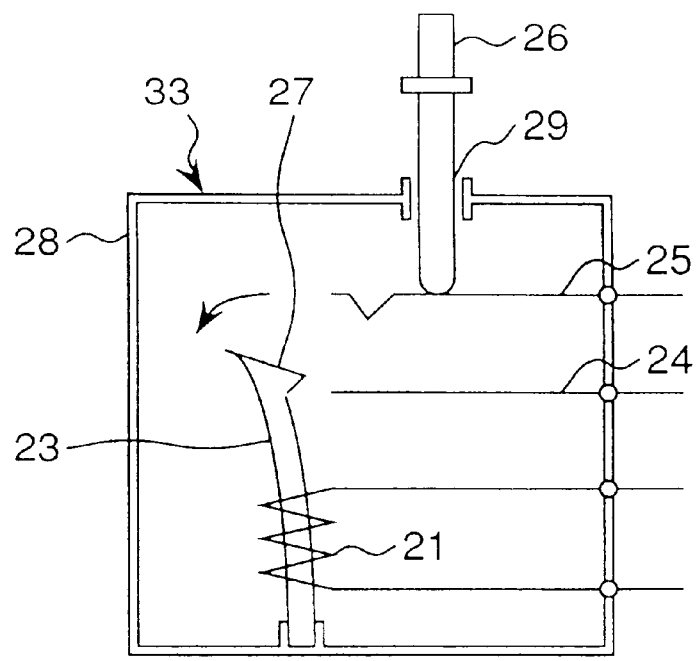
FIG. 12 is a partial enlarged view of FIG. 11.

FIG. 12 shows the circuit protector 33, of which contacts 24 and 25 are normally open. The bimetal member 23 is heated by the heating wire 21 and comprises on the end thereof a claw 27. The claw 27 engages the end of the contact 25 when the contact 25 is pressed in contact with the other contact 24. A reset button 26 is disposed to travel in and out through a through-hole 29 in the body 28, and is used to re-establish contact between the contacts 24 and 25 when the contacts are open.

Figure 11:
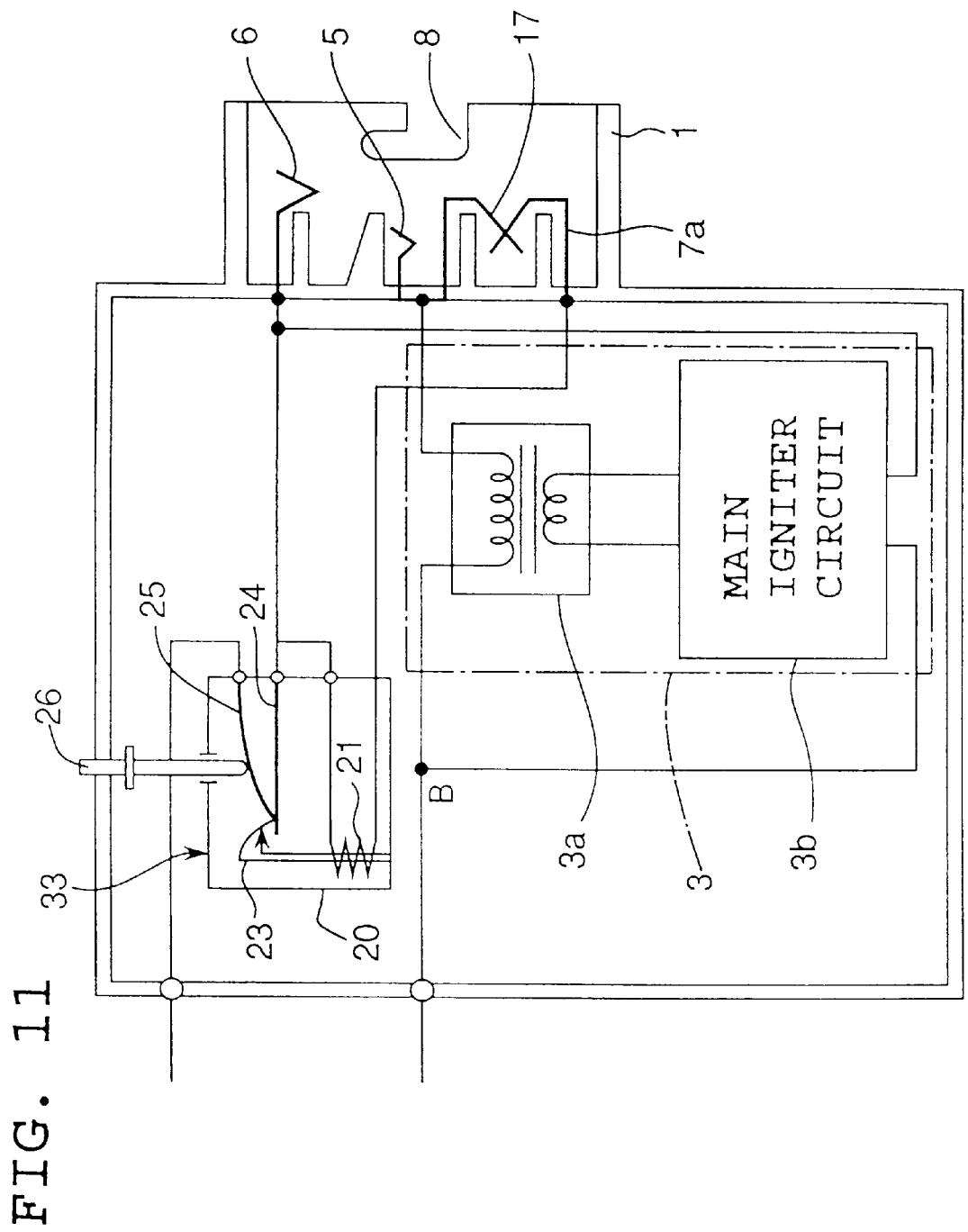
FIG. 11 is a diagram used to describe the sixth embodiment of the invention.

Note that the circuit state shown in FIG. 11 is that when the contacts 24 and 25 are closed (contacting), and the stabilizing circuit 2 is outputting to the outside electrode 6. The current flowing from the stabilizing circuit 2 through the auxiliary electrode 7a also heats the heating wire 21 inside the circuit protector 33, thus causing the bimetal member 23 to deflect in the direction of the arrow in FIG. 12. The claw 27 thus releases the contact 25. Because the contact 25 is a leaf spring member, moving the bimetal member 23 in the direction of the arrow to release the contact 25 causes the contacts 24 and 25 to open (separate), thereby cutting off output from the stabilizing circuit 2. When the bimetal member 23 cools and returns to the original position, the reset button 26 can be pressed to re-close the contacts 24 and 25, thereby enabling the claw 27 of the bimetal member 23 to re-engage the contact 25 and hold the contacts 24 and 25 closed.

When the discharge lamp is installed to the lamp socket 1, the auxiliary electrode 7a and center electrode 5 are pushed open by the discharge lamp base, thereby enabling high voltage output and the discharge lamp to start.

This eighth embodiment of the invention is otherwise identical to the first embodiment above.

It should be noted that the circuit protector 33 shall not be limited to that described above, and may alternatively be, for example, an electromagnetic circuit protector.

Figure 13:
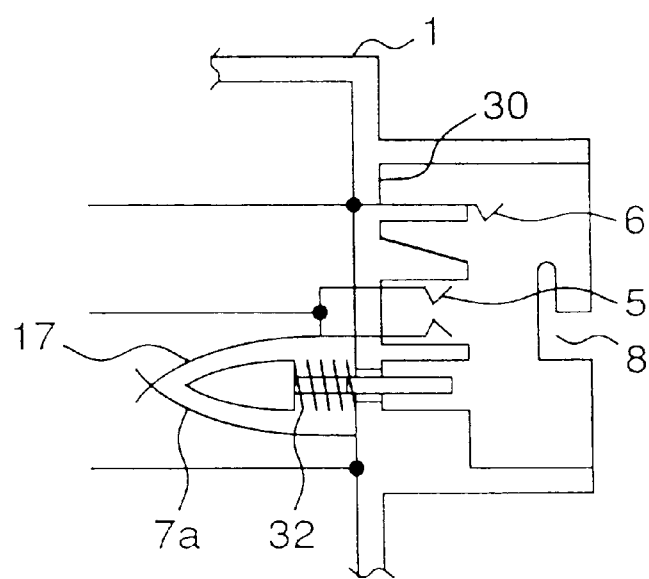
FIG. 13 is an enlarged view of the lamp socket shown in FIG. 11.

The ninth embodiment of the present invention is described next with reference to FIG. 13. In this embodiment the short bar 17 of the auxiliary electrode 7a and the center electrode 5 in the eighth embodiment is disposed to the inside of the divider 30 at the base of the lamp socket insertion opening 1a, and an insulated member 31 passes through divider 30. When the lamp base is inserted to the lamp socket 1, the insulated member 31 separates the short bar 17 and the auxiliary electrode 7a. When the short bar 17 and auxiliary electrode 7a are separated by the insulated member 31, the distance between the bar and electrode is set to assure a sufficient insulation gap to the applied high voltage. Note that the spring 32 forces the insulated member 31 toward the lamp socket 1 in the discharge lamp contact direction, but may be a tension spring or a compression spring when the spring force causing contact between the short bar 17 and auxiliary electrode 7a is greater. This ninth embodiment is otherwise identical to the eighth embodiment above.

Discharge Lamp Lighting Unit (lamp socket with igniter)

The preferred embodiments of a discharge lamp lighting unit integrating the lamp socket 1 and igniter 3 (starting circuit) are described next below.

Embodiment 1

Figure 14:
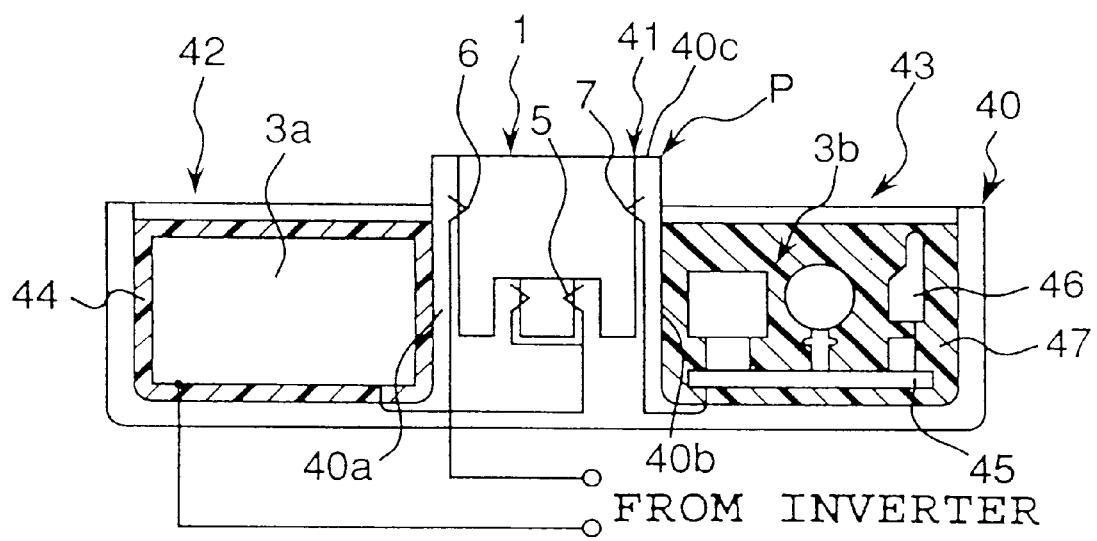
FIG. 14 is a cross sectional view of the first embodiment of a discharge lamp lighting unit according to the present invention.

The first embodiment of a discharge lamp lighting unit according to the present invention is described with reference to FIG. 14. As shown in FIG. 14, the basic structure of this discharge lamp lighting unit is a resin case 40 comprising a lamp socket compartment 41, high voltage transformer compartment 42, and main igniter circuit compartment 43.

A pair of dividing walls 40a and 40b are formed in the middle widthwise to the case 40, thus dividing the inside of the case 40, which is open to the top, into three compartments. Barrel wall 40c is formed between and slightly taller than the pair of dividing walls 40a and 40b to form the lamp socket 1. The high voltage transformer 3a of the igniter 3 is embedded in the high voltage transformer compartment 42 on the left side of the lamp socket 1 in a resin filler 44 of epoxy or other relatively hard resin material. The main igniter circuit 3b, comprising a circuit board 45 and capacitors, triac, or other electronic components 46 mounted on the circuit board 45, is similarly embedded in a urethane or other relatively soft resin filler 47 in the main igniter circuit compartment 43. Because the two compartments 42 and 43 are separated by dividing walls 40a and 40b, the different fillers 44 and 47 are not mixed.

It should also be noted that the connections between the center and outside main electrodes 5 and 6 and the auxiliary outside electrode 7 may be as described in any of the preceding embodiments shown in FIGS. 1–13.

By thus creating a single unit containing both the lamp socket 1 and starting circuit 3, a special case is not needed for the high voltage transformer or other components. The number of parts is thus reduced, and assembly is greatly simplified when this unit is used, for example, for a motor vehicle headlight.

Figure 15:
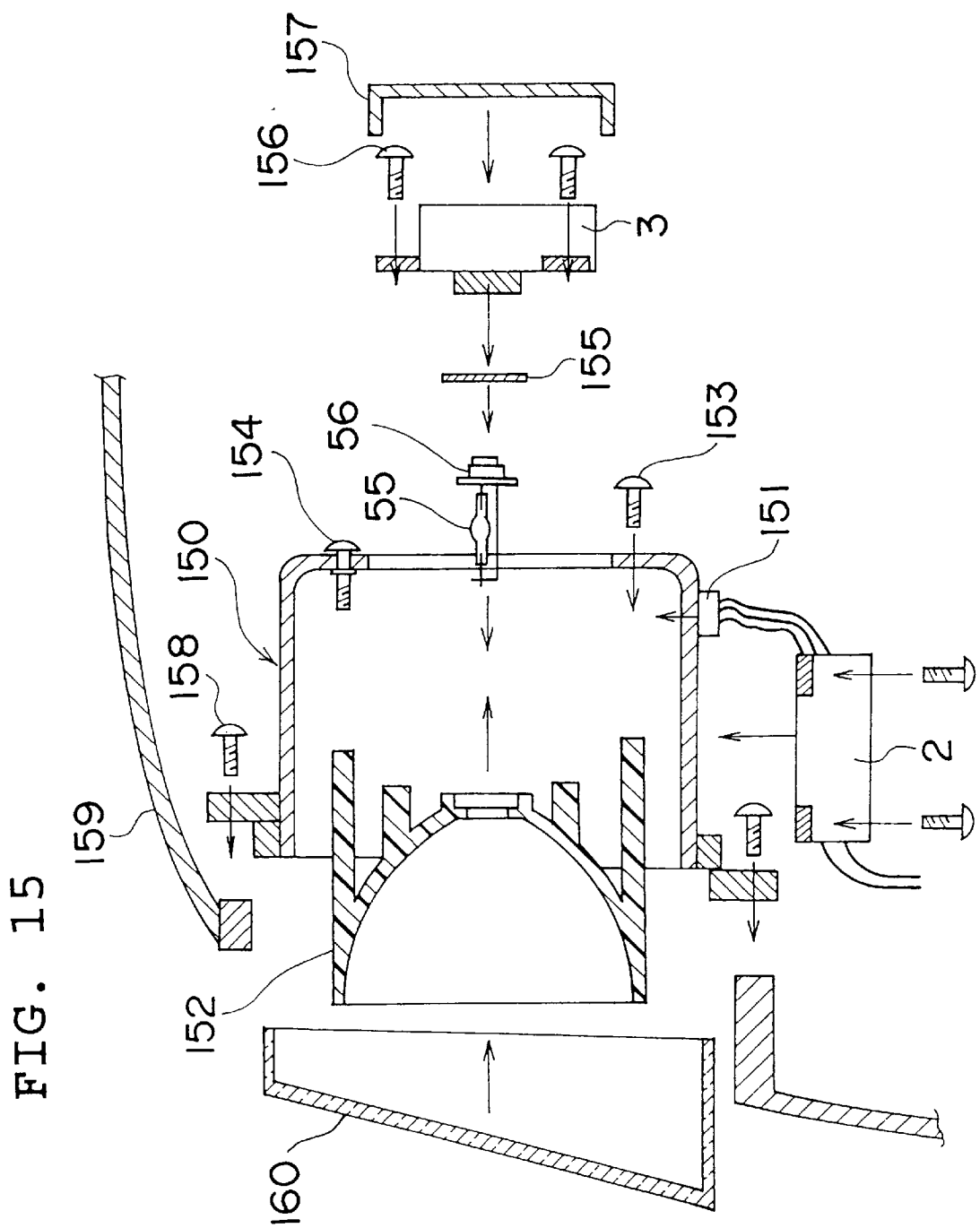
FIG. 15 and FIG. 16 show an applied example of the discharge lamp lighting unit shown in FIG. 14 assembled as a headlight unit for a motor vehicle, FIG. 15 showing the discharge lamp lighting unit before assembly, and FIG. 16 after assembly.

The assembly procedure is shown by the arrows in FIG. 15. The stabilizing circuit (inverter) 2 connected to the power supply is screwed to the outside bottom of the headlight housing 150, and the connector 151 is inserted to the inside of the headlight housing 150. The reflector 152 is then fastened inside the headlight housing 150 using reflector mounting screw 153 and optical axis aiming bolt 154. The discharge lamp 55 is inserted to the center of the reflector 152 and fastened to the reflector 152 using lamp mounting socket 155. The discharge lamp lighting unit (socket with igniter) is then fit to the base 56 of the discharge lamp 55, and this unit is fastened to the back of the reflector 152 using screws 156. After fastening the headlight cover 157 to the headlight housing 150, the front of the headlight housing 150 is fastened to the vehicle body 159 using bolts 158. The outer lens 160 is fastened to the body 159 by means of a suitable securing means (not shown in the figures) before the headlight housing 150 is installed to the body 159.

Figure 16:
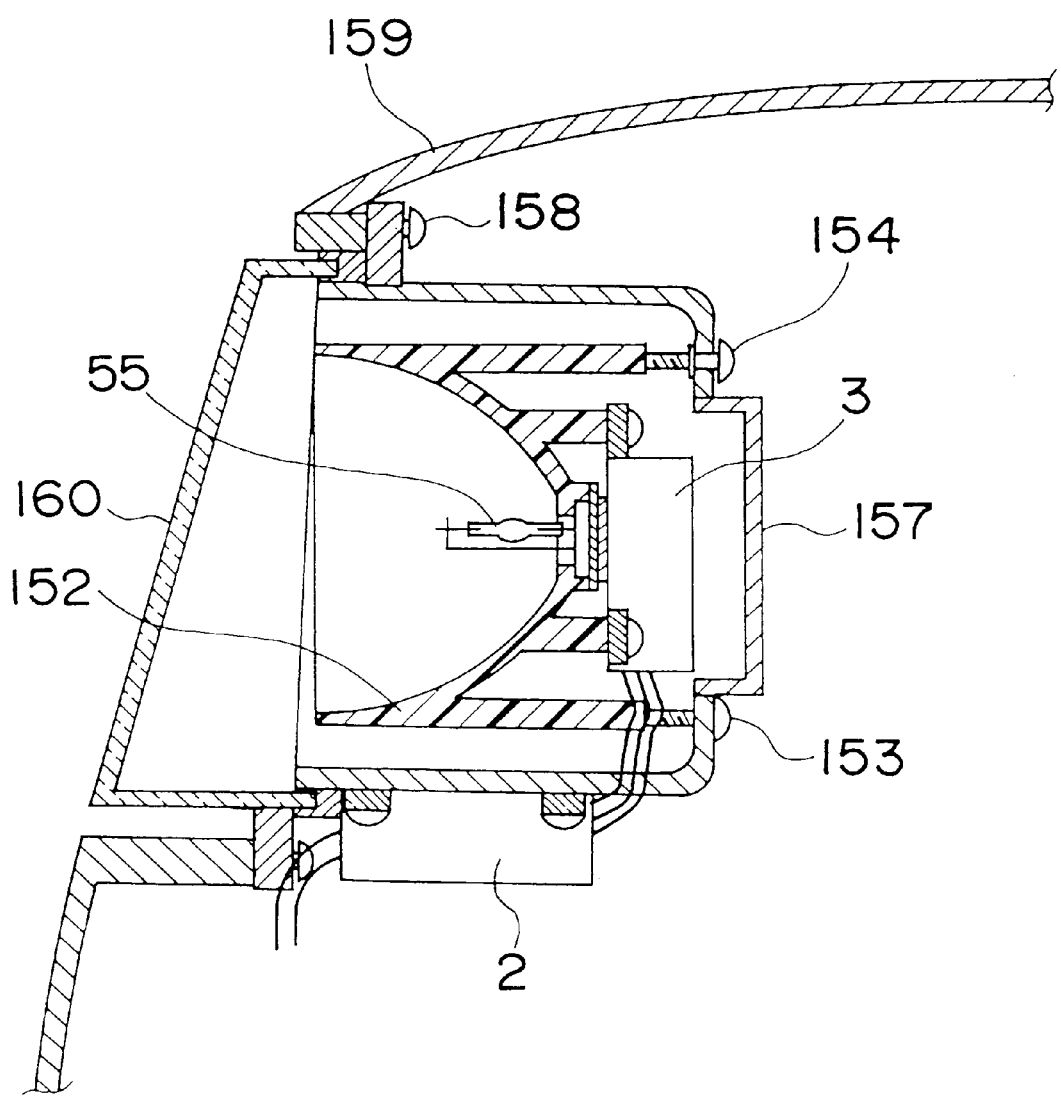

FIG. 16 shows the completed installation.

It should be noted that the structure supporting the lamp socket member of this unit by means of the reflector preferably places the unit's center of gravity as close to the support position as possible in order to minimize vibration. As a result, the positioning of the heavy high voltage transformer 3a to the lamp socket is preferably determined to appropriately control the relationship between this support position and the center of gravity.

Figure 17:
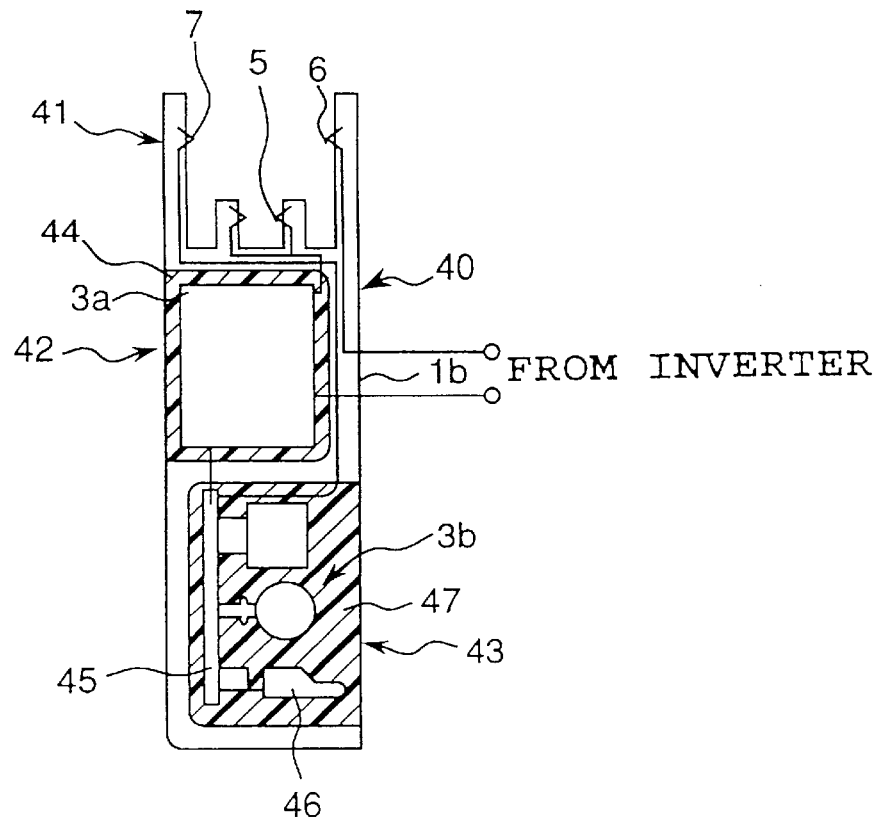
FIGS. 17 to 27 are each cross sectional diagrams of a discharge lamp lighting unit as shown in FIG. 14.

A second embodiment of this discharge lamp lighting unit is shown in FIG. 17. Specifically, the high voltage transformer compartment 42 is formed below the lamp socket compartment 41, and the main igniter circuit compartment 43 is formed below the high voltage transformer compartment 42 with the opening of the main igniter circuit compartment 43 facing a different direction from that of the high voltage transformer compartment 42. More specifically, this configuration places the starting circuit 3 axially to the lamp socket 1 while preventing mixing of the dissimilar resins by orienting the openings to the high voltage transformer compartment 42 and main igniter circuit compartment 43 in different directions.

This second embodiment is otherwise identical to that shown in FIG. 14.

Figure 18:
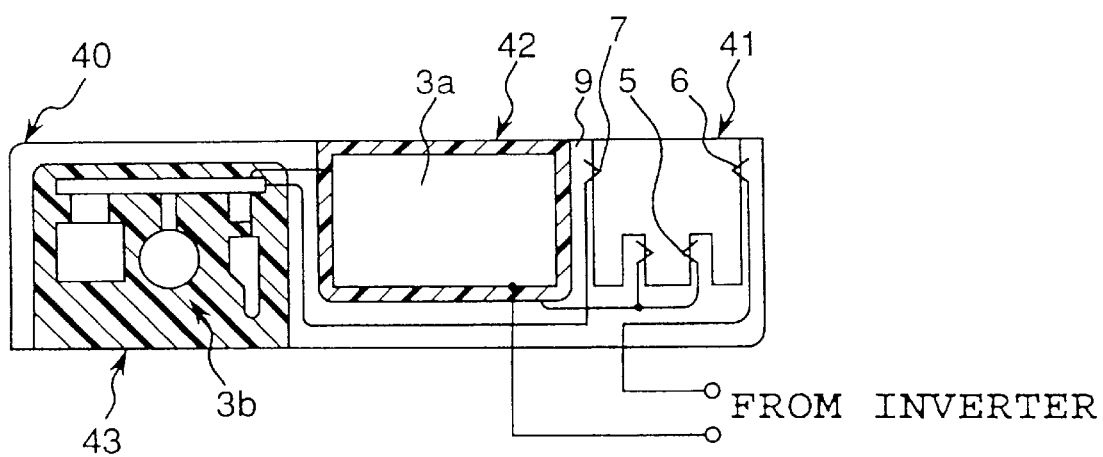

A third embodiment of a discharge lamp lighting unit according to the present invention is shown in FIG. 18. In this embodiment the opening of the high voltage transformer compartment 42 is oriented in the same direction as the lamp insertion opening of the lamp socket compartment 41 in the case 40, and the main igniter circuit compartment 43 is formed facing the opposite direction.

As will be obvious from a comparison of FIGS. 17 and 18, this third embodiment differs from the second embodiment primarily in that the compartment openings in this embodiment are arrayed perpendicularly to the axial direction.

Figure 19:
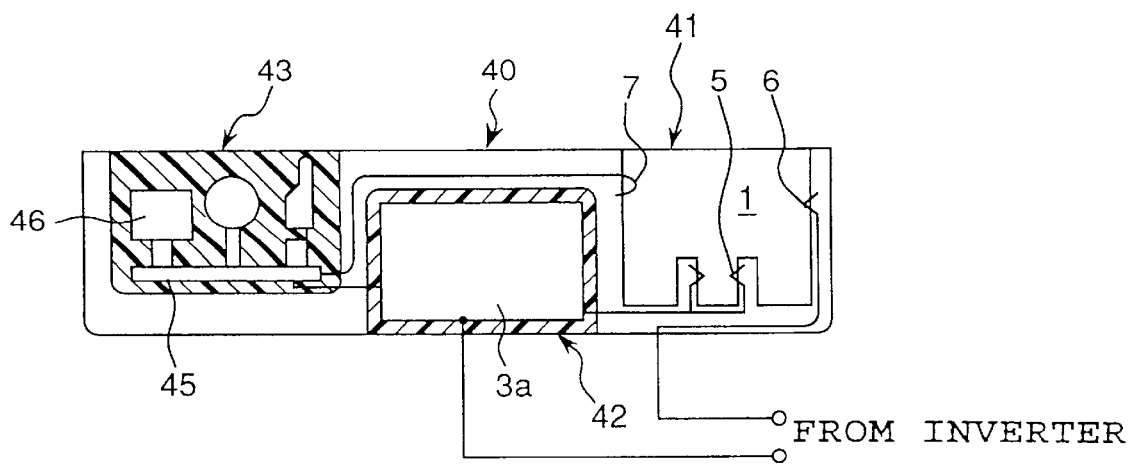

A fourth embodiment of the discharge lamp lighting unit is shown in FIG. 19. The discharge lamp lighting unit of this embodiment differs from the third embodiment in that the opening of the main igniter circuit compartment 43 is oriented in the same direction as the lamp insertion opening of the lamp socket compartment 41 in the case 40, and the high voltage transformer compartment 42 is formed facing the opposite direction. This embodiment is otherwise identical to the third embodiment above.

Figure 20:
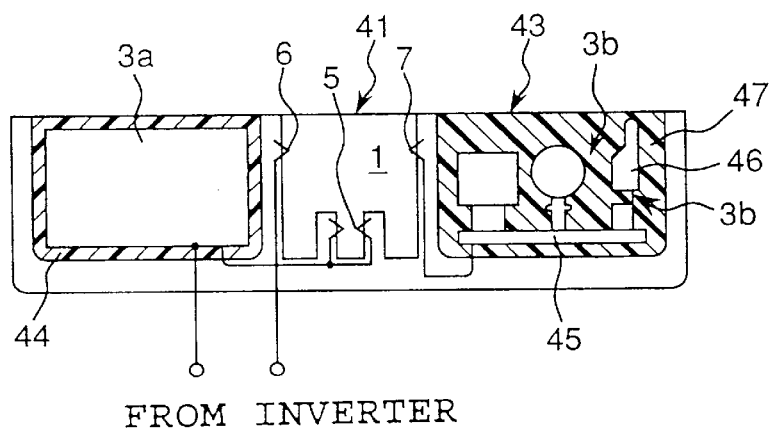

A fifth embodiment of a discharge lamp lighting unit according to the present invention is shown in FIG. 20. This embodiment differs from the second in that the lamp socket compartment 41 is disposed between the high voltage transformer compartment 42 and the main igniter circuit compartment 43. In addition, the openings of the high voltage transformer compartment 42 and the main igniter circuit compartment 43 face the same direction as the opening of the lamp socket compartment 41 in the case 40. In addition, the height of the lamp socket compartment 41 is the same as that of the other compartments 42 and 43. This configuration facilitates maintaining a good overall weight balance. This embodiment is otherwise identical to the second embodiment above.

Figure 21:
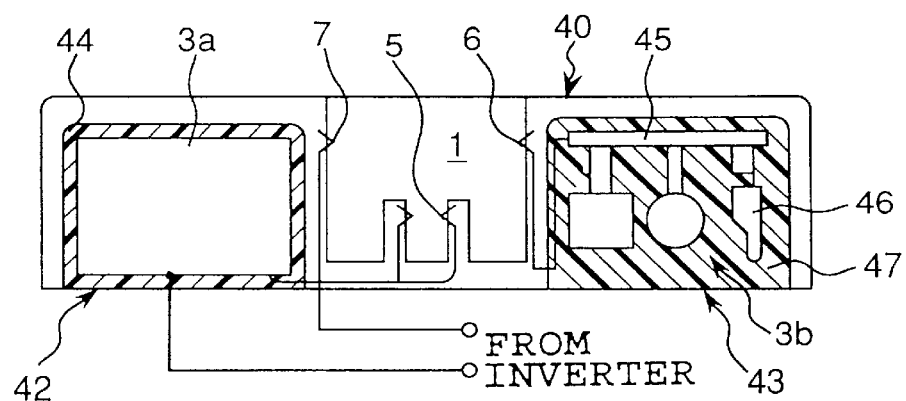

A sixth embodiment of this discharge lamp lighting unit is shown in FIG. 21. This embodiment differs from the fifth in that the openings to the high voltage transformer compartment 42 and main igniter circuit compartment 43 are oriented in the direction opposite the lamp base insertion opening of the lamp socket compartment 41 formed in the case 40. This embodiment is otherwise identical to the fifth embodiment above.

Figure 22:
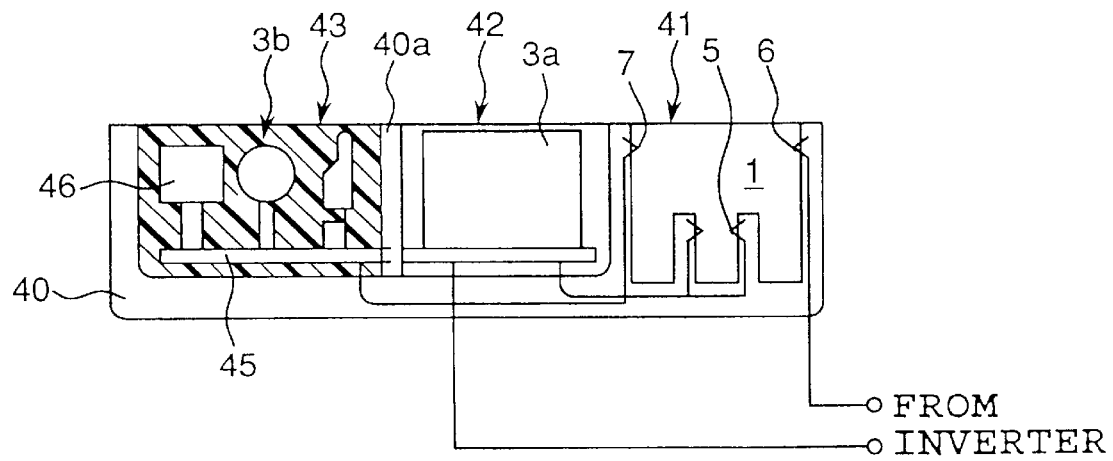

A seventh embodiment of this discharge lamp lighting unit is shown in FIG. 22. This embodiment differs from the second in that the divider 40a is formed separately to the case 40 and is used to separate the high voltage transformer compartment 42 and main igniter circuit compartment 43. The middle of the circuit board 45 is secured below this divider 40a with the high voltage transformer 3a and the electronic components of the main igniter circuit 3b mounted to the circuit board 45 on opposite sides of the divider 40a. This embodiment is otherwise identical to the second embodiment above.

In addition to the effects obtained by the second embodiment above, this configuration makes assembly easier because the high voltage transformer 3a and main igniter circuit 3b can be assembled outside the case 40.

Figure 23:
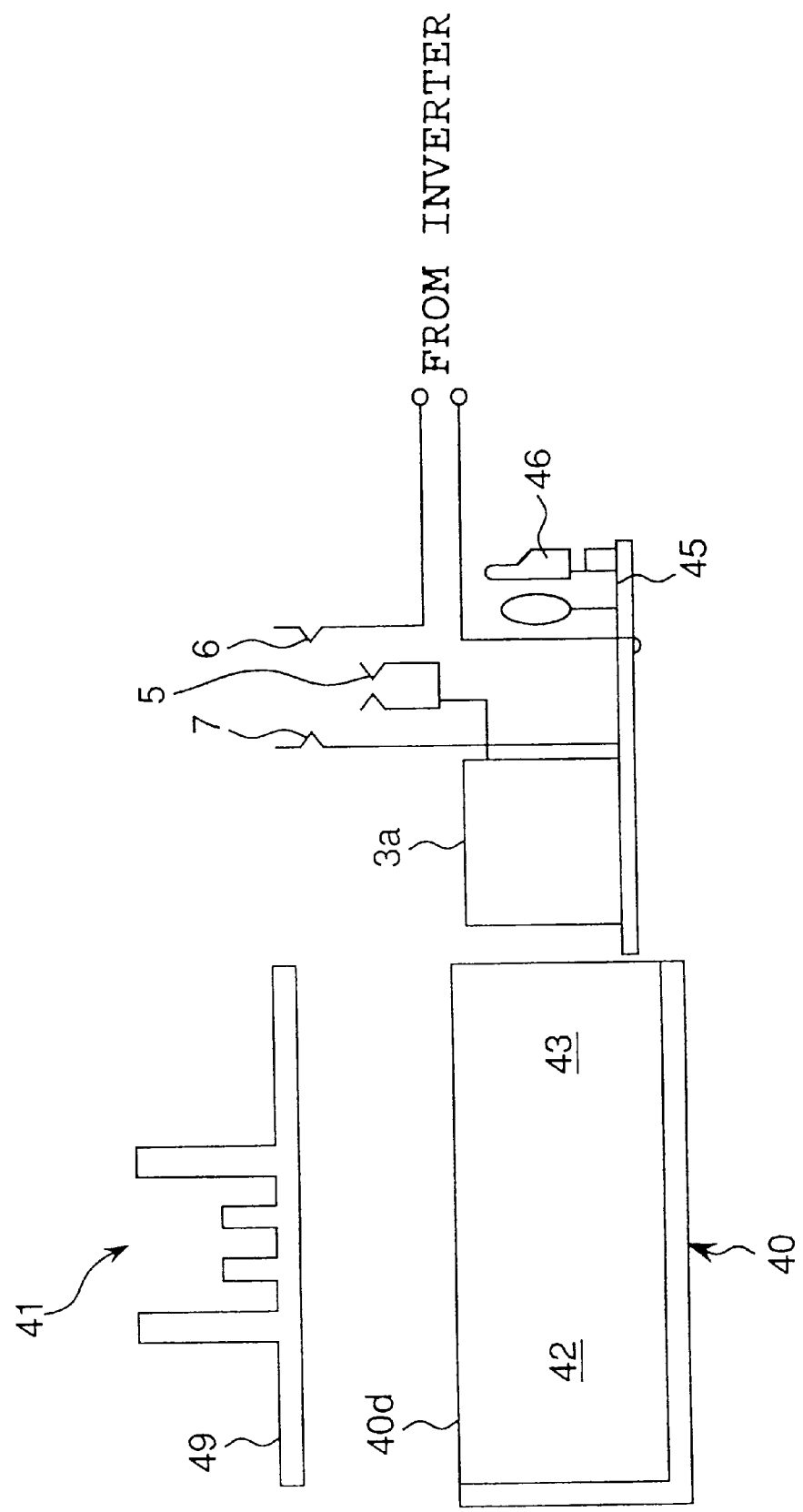
Figure 24:
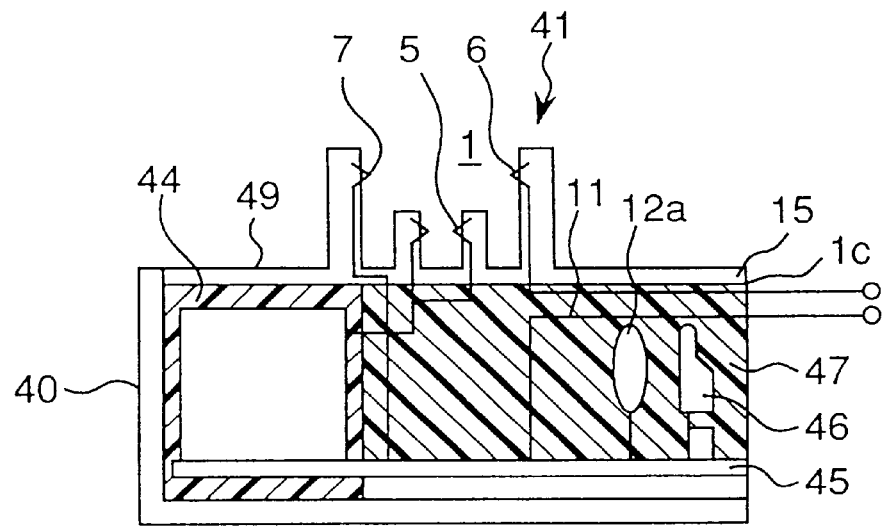

An eighth embodiment of this discharge lamp lighting unit is shown in FIGS. 23 and 24. This discharge lamp lighting unit differs from the first embodiment thereof in that an assembly opening 40d open to the main igniter circuit compartment 43 and high voltage transformer compartment 42 is provided in the case 40 in the direction roughly perpendicular to the orientation of the lamp insertion opening of the lamp socket compartment 41. An opening cover 49 is further provided to the case 40, and the lamp socket compartment 41 is formed on top of the cover 49. The high voltage transformer 3a is mounted to the circuit board 45 of the main igniter circuit 3b, and is housed in the case 40 with the circuit board 45 at the inside, i.e., the bottom, of the assembly opening 40d. The high voltage transformer 3a is embedded in an epoxy resin filler 44 while the main igniter circuit 3b is embedded in a urethane filler 47.

By thus eliminating the need for a divider wall, the number of parts is reduced by this embodiment, reducing both the cost and the size of the discharge lamp lighting unit.

Figure 25:
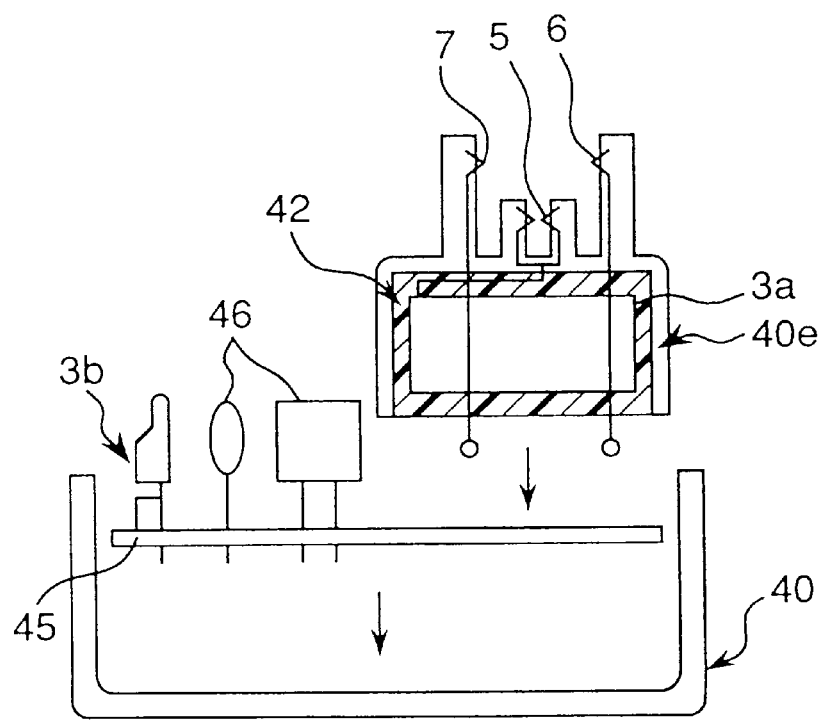
Figure 26:
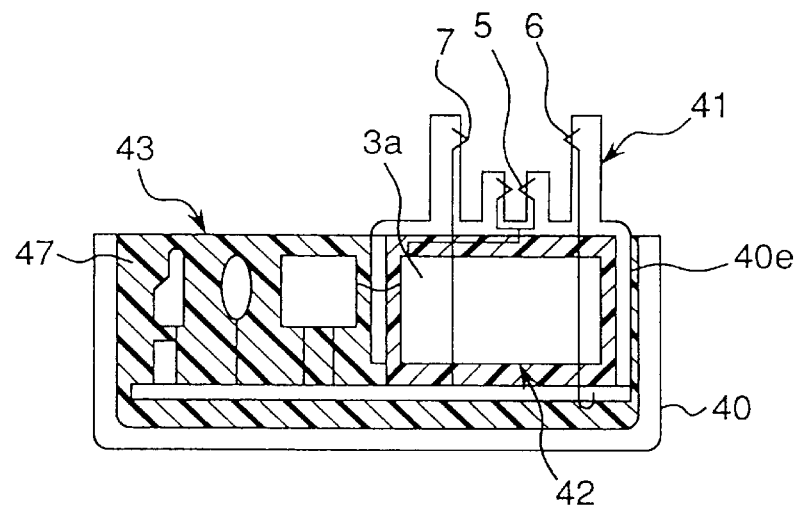

The ninth embodiment of this discharge lamp lighting unit is shown in FIGS. 25 and 26. This embodiment differs from the first in that the case 40 is divided into a part 40e integrating the lamp socket compartment 41 and the high voltage transformer compartment 42, and the main igniter circuit compartment 43. The high voltage transformer compartment 42 housing the high voltage transformer 3a and the lamp socket compartment 41 are therefore housed in the main igniter circuit compartment 43, and embedded in a urethane filler 47.

In this embodiment the part 40e of case 40 is integrally formed with the lamp socket compartment 41 and high voltage transformer compartment 42 facing opposite directions, the high voltage transformer 3a housed in the high voltage transformer compartment 42, and embedded in an epoxy resin filler 44. The main igniter circuit compartment 43 has sufficient space to house both the main igniter circuit 3b and the high voltage transformer compartment 42, and when the high voltage transformer compartment 42 is housed in the main igniter circuit compartment 43, the lamp socket compartment 41 extends outside the case 40. The high voltage transformer 3a is also mounted on the circuit board 45 holding the main igniter circuit 3b.

Assembly is also simplified because the high voltage transformer 3a and electronic components 46 of the main igniter circuit 3b are first mounted to the circuit board 45, then housed in the main igniter circuit compartment 43. The main igniter circuit 3b is then embedded in urethane filler 47. This embodiment is otherwise identical to the first embodiment of the discharge lamp lighting unit above.

It should be noted that the resins used for the fillers of the present invention shall not be limited to those described above, and the same resin may be used to embed both the high voltage transformer 3a and the main igniter circuit 3b.

Figure 27:
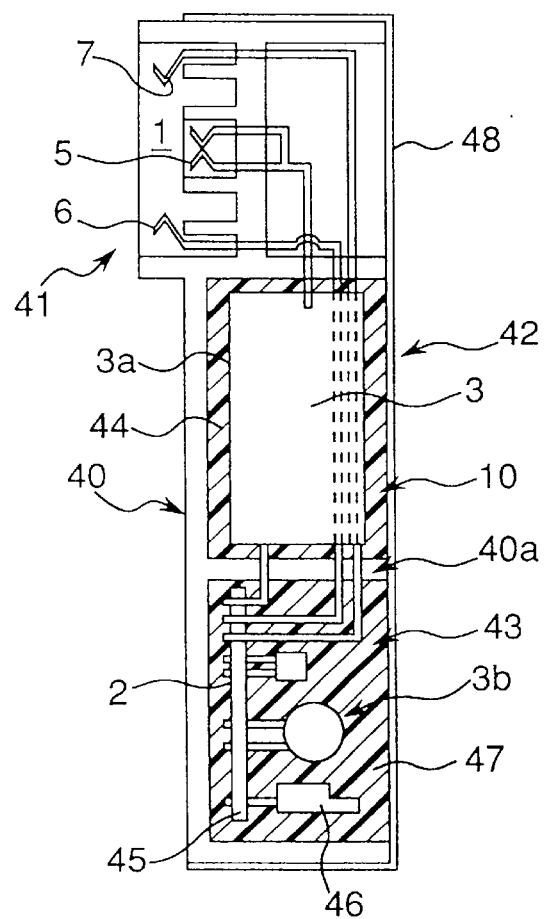

The tenth embodiment of a discharge lamp lighting unit according to the present invention is shown in FIG. 27. In this embodiment the lamp socket compartment 41 is formed at the top with the high voltage transformer compartment 42 formed therebelow and the main igniter circuit compartment 43 formed on the bottom below the high voltage transformer compartment 42. The openings to the compartments 42 and 43, and the lamp socket compartment 41 in this embodiment face opposite directions, and compartments 42 and 43 are separated by a divider 40a. The back of the case 40 (i.e., the open side of compartments 42 and 43) is covered by a cover 48 formed from a conductive material. The conductive cover 48 of this embodiment is able to reliably shield the noise emitted from the lamp.

This tenth embodiment is otherwise identical to the preceding embodiments.

The eleventh embodiment of a discharge lamp lighting unit according to the present invention is described with reference to FIGS. 28–30.

Figure 28:
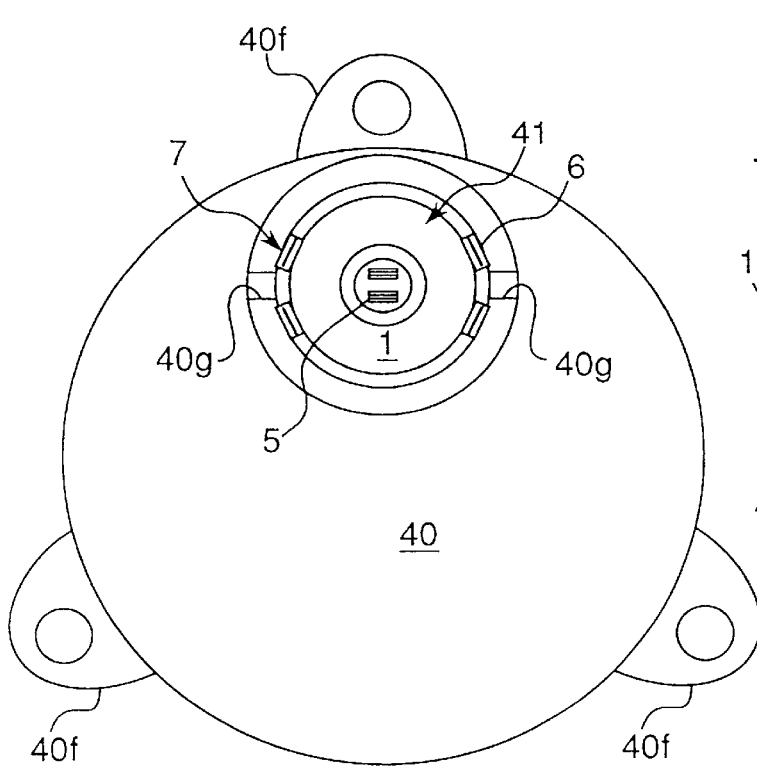
FIGS. 28–30 are views of specific examples of the discharge lamp lighting unit according to the present invention, FIG. 28 being a front view, FIG. 29 a cross section at the middle, and FIG. 30 a rear view with the cover removed.

As shown in the front view in FIG. 28, the case 40 is a tubular body with a closed end face, mounting flanges 40f formed at equal 120 degree intervals around the outside circumference, and a lamp socket compartment 41 forming the lamp socket 1 formed at the top center of the end wall. The center electrode 5 is formed at the center of the lamp socket 1 with the outside electrode 6 formed as the main electrode on one side and another outside electrode 7 formed as the auxiliary electrode on the other side. Pin slots 40g are formed to engage and hold the discharge lamp lock pins (56c in FIG. 33).

Figure 29:
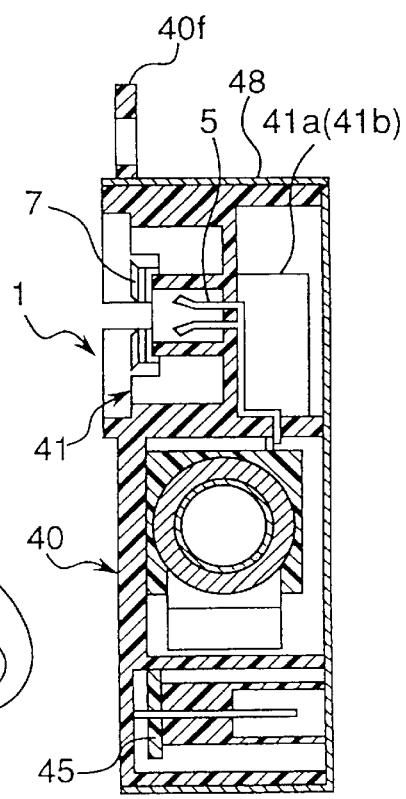
Figure 30:
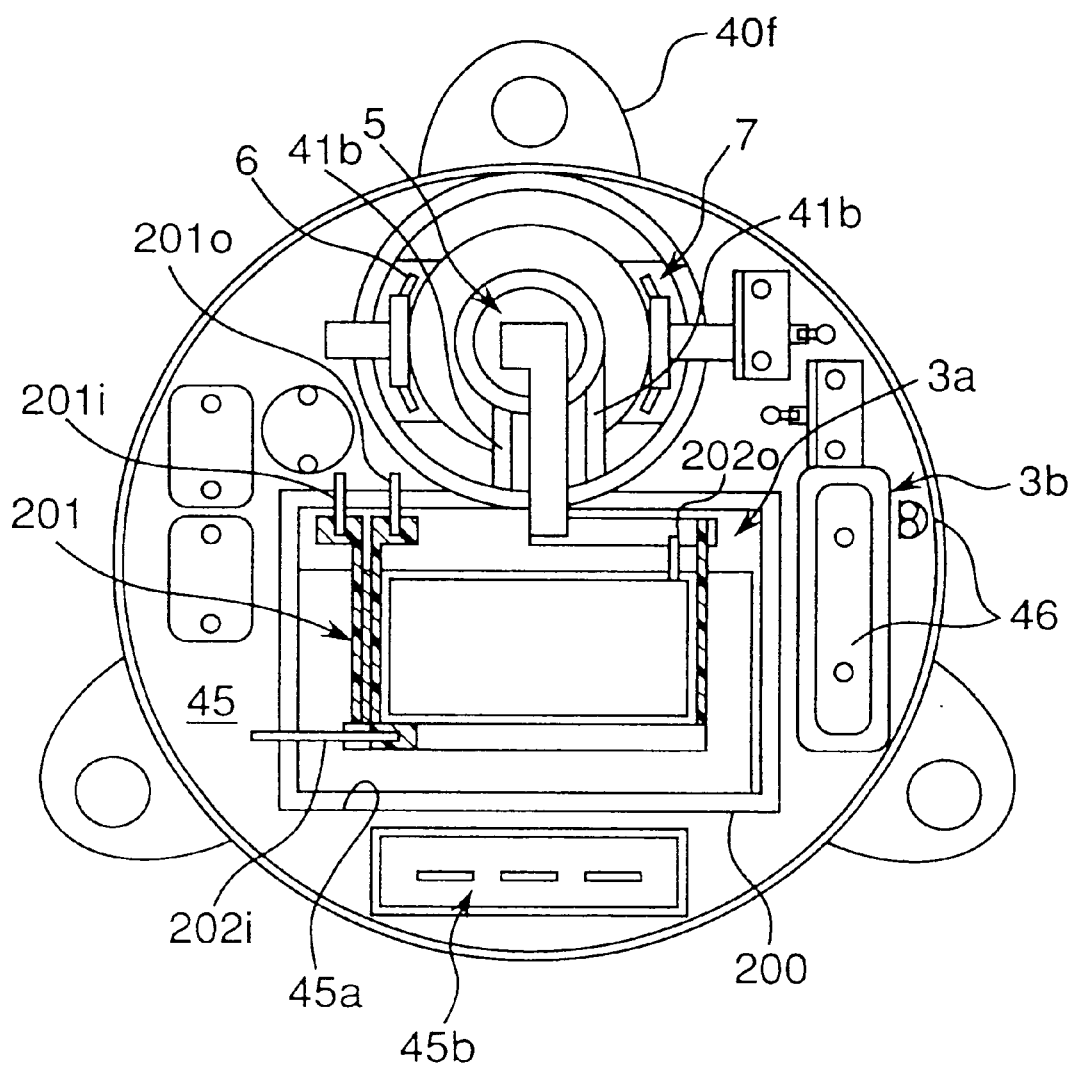

As shown in FIG. 29 and more clearly in FIG. 30, a circular circuit board 45 comprising a fitting for the lamp socket 1 and an opening 45a for installing the high voltage transformer is fastened inside the case 40. The high voltage transformer 3a is installed through the opening 45a with the circuit board 45 secured in place. The electronic components 46 forming the main igniter circuit 3b are mounted to the circuit board 45 around the opening 45a, and a connector 45b is provided for connection with the connector (151 in FIG. 15) from the inverter (not shown in the figure).

The high voltage transformer 3a comprises a core 200, primary coil 201, secondary coil 202, and bobbin 203 as described in the literature. The input and output terminals 201i and 201o of the primary coil 201, and the input terminal 202i of the secondary coil 202, are respectively connected to known parts of the circuit board 45, and the high voltage output 202o of the secondary coil 202 is connected to the center electrode 5 of the lamp socket 1. The outside electrode 6 and auxiliary electrode 7 are also connected to known parts of the circuit board 45, and the ground terminal of the connector 45b is connected to the cover 48 to ground the cover 48.

Note that as shown in FIGS. 29 and 30 the insulated walls 41a and 41b standing out from the end wall as though to enclose the leads from the center electrode 5 to the high voltage transformer 3a are preferably provided on the bottom of the lamp socket compartment 41 to insulate the outside electrode 6 from the auxiliary electrode 7.

The connections between the electrodes 5, 6, and 7, the high voltage transformer 3a, and the main igniter circuit 3b are basically the same as shown in FIG. 2, forming the disabling means that is characteristic of the present invention.

Though not specifically shown, part of the high voltage transformer 3a is embedded in a resin filler by vacuum injecting an epoxy resin, and the main igniter circuit 3b is embedded by silicon injection molding on the circuit board 45.

Figure 31:
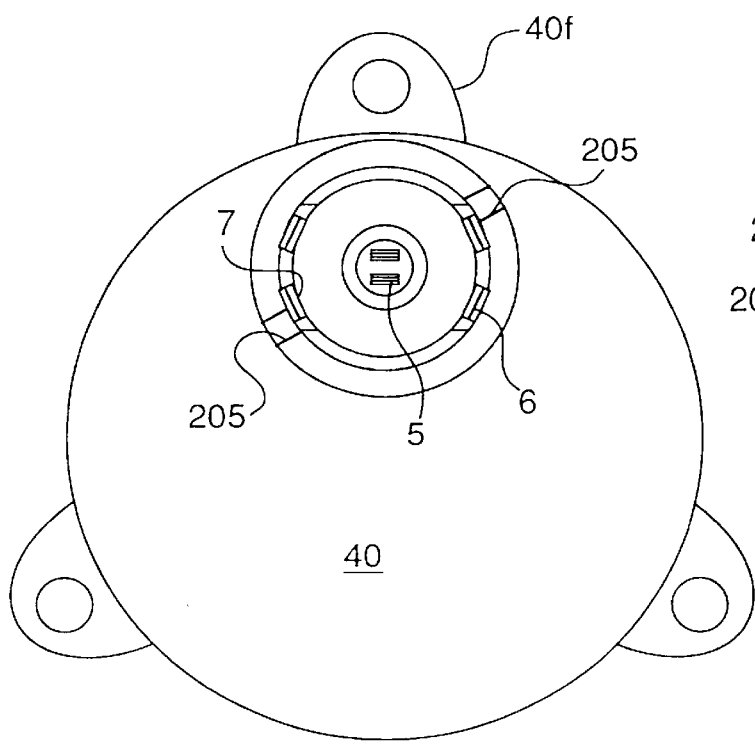
FIGS. 31 and 32 are front and middle cross sectional views of a specific example of the discharge lamp lighting unit according to the present invention.
Figure 32:
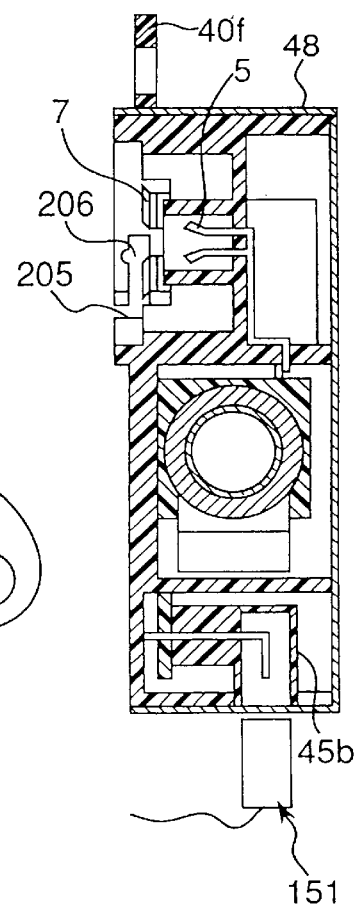

A twelfth embodiment of a discharge lamp lighting unit according to the present invention is shown in FIGS. 31 and 32.

As will be obvious by comparison with FIGS. 28 and 29 showing the eleventh embodiment described above, a lamp socket compartment 41 engaging the lock pins (56c) of the discharge lamp 55 is formed in this twelfth embodiment. Thus, when the discharge lamp is installed, the lock pins are inserted to the starting channel 205 in the axial direction of the lamp socket compartment 41, and the discharge lamp is then turned so that the pins travel along locking channel 206, which is roughly perpendicular to the starting channel 205, thereby firmly engaging the lock pins and holding the discharge lamp securely.

Note that the connector 45b of the igniter 3 is formed facing down so that the connector 151 of the inverter can be inserted from below. This embodiment is otherwise identical to the eleventh embodiment above.

If the discharge lamp lighting unit is constructed according to the eleventh or twelfth embodiments of the invention, the discharge lamp lighting unit can be made extremely compact and installation simple.

What is claimed is:

1. A discharge lamp lighting device comprising:
a lamp socket including a pair of main electrodes for connecting a discharge lamp;
a stabilizing circuit connected to a power source and outputting a voltage to said lamp socket;
a starting circuit connected between said stabilizing circuit and said lamp socket, activated before said discharge lamp begins discharging to generate a high voltage required to start discharging, and deactivated after discharging begins;
means for deactivating said starting circuit when said discharge lamp is not installed in response to installation or non-installation of said discharge lamp to said lamp socket; and
said deactivating means including an auxiliary electrode to deactivate said starting circuit when said discharge lamp is not installed by interrupting a connection between said auxiliary electrode and one of said pair of main electrodes, and activating said starting circuit when said discharge lamp is installed by connecting conductively said auxiliary electrode and said one of said pair of main electrodes.

2. A discharge lamp lighting device comprising:
a lamp socket including a pair of main electrodes for connecting a discharge lamp;
a stabilizing circuit connected to a power source and outputting a first voltage and a second voltage that is lower than said first voltage;
a starting circuit that is connected between said stabilizing circuit and said lamp socket, being activated when said first voltage is input from said stabilizing circuit to discharge said discharge lamp by generating a high voltage required to start said discharge lamp discharging, and being deactivated when said second voltage is input thereto after discharging begins, connecting said stabilizing circuit directly to said lamp socket to stably discharge said discharge lamp;
means for deactivating said starting circuit in response to installation or non-installation of said discharge lamp to said lamp socket; and
said deactivating means including an auxiliary electrode to deactive said starting circuit when said discharge lamp is not installed by interrupting a connection between said auxilialy electrode and one of said pair of main electrodes, and activating said starting circuit when said discharge lamp is installed by connecting conductively said auxiliary electrode and said one of said pair of main electrodes.

3. A discharge lamp lighting device according to claim 1 wherein said deactivating means is a means that switches the electrical connection between said stabilizing circuit and said starting circuit on and off in response to installation or non-installation of said discharge lamp.

4. A discharge lamp lighting device according to claim 1 wherein said deactivating means is a means forming a closed circuit to the output of said stabilizing circuit when said discharge lamp is not installed, and opening said closed circuit when said discharge lamp is installed.

5. A discharge lamp lighting device according to claim 1 wherein said deactivating means is provided inside said lamp socket.

6. A discharge lamp lighting device according to claim 1 wherein said starting circuit is assembled integrally to said lamp socket.

7. A discharge lamp lighting device according to claim 5 wherein the connection between said auxiliary electrode and one of the main electrodes is established by a conductive part of said discharge lamp.

8. A discharge lamp lighting device according to claim 7 wherein the conductive part of said discharge lamp is an outside electrode provided in the base of said discharge lamp.

9. A discharge lamp lighting device according to claim 7 wherein the conductive part of said discharge lamp is the center electrode provided in the base of said discharge lamp.

10. A discharge lamp lighting device according to claim 1 wherein one main electrode of said lamp socket is connected to an output terminal of said stabilizing circuit by means of said starting circuit, and the other main electrode is connected directly to the output terminal of said stabilizing circuit.

11. A discharge lamp lighting device according to claim 1 wherein both of the pair of main electrodes for said lamp socket are connected to the output terminal of said stabilizing circuit by means of said starting circuit such that a high voltage differing in polarity is applied to each electrode, and
a high voltage blocking means is connected to said auxiliary electrode.

12. A discharge lamp lighting device according to claim 11 wherein said high voltage blocking means is a secondary coil of a high voltage transformer provided in said starting circuit and generating a high voltage approximately equal to and having the same polarity as the high voltage applied to the other main electrode.

13. A discharge lamp lighting device according to claim 1 wherein said auxiliary electrode is connected to a conductive part of said discharge lamp when said discharge lamp is connected, and the position of this auxiliary electrode connection is disposed toward the inside of said lamp socket from the contact position between the other main electrode and the conductive part of said discharge lamp.

14. A discharge lamp lighting device according to claim 1 wherein said starting circuit is located outside of said lamp socket.

15. A discharge lamp light device according to claim 14 wherein said high voltage blocking means connected to said auxiliary electrode is integrally assembled with said lamp socket.

16. A discharge lamp lighting unit comprising
a lamp socket member for connecting a discharge lamp;
a case comprising a high voltage transformer housing and a main igniter circuit housing;
a high voltage transformer housed in said high voltage transformer housing and forming part of a main igniter circuit embedded in a filler; and
said main igniter circuit housed in said main igniter circuit housing and embedded in the filler.

17. A discharge lamp lighting unit according to claim 16 wherein said high voltage transformer housing and said main igniter circuit housing are separated by a partition wall.

18. A discharge lamp lighting unit according to claim 17 wherein said high voltage transformer housing is formed on one side of said case, and said main igniter circuit housing is housed on the other side of said case.

19. A discharge lamp lighting unit according to claim 18 wherein an opening to said high voltage transformer housing is oriented in the same direction as the opening of said lamp socket member of said case.

20. A discharge lamp lighting unit according to claim 18 wherein an opening to said main igniter circuit housing is oriented in the same direction as the opening of said lamp socket member of said case.

21. A discharge lamp lighting unit according to claim 17 wherein said lamp socket member is disposed between said high voltage transformer housing and said main igniter circuit housing.

22. A discharge lamp lighting unit according to claim 21 wherein openings of said high voltage transformer housing and said main igniter circuit housing are oriented in the same direction as the opening of said lamp socket member of said case.

23. A discharge lamp lighting unit according to claim 21 wherein openings of said high voltage transformer housing and said main igniter circuit housing are oriented in the direction opposite that of the lamp socket of said lamp socket member of said case.

24. A discharge lamp lighting unit according to claim 17 wherein said partition wall is formed separately to said case.

25. A discharge lamp lighting unit according to claim 16 wherein said case has an opening opened to said main igniter circuit housing and said high voltage transformer housing in the direction perpendicular to the orientation of the opening of said lamp pocket means.

26. A discharge lamp lighting unit according to claim 16 wherein said case is separated into said main igniter circuit housing and a part integrating said lamp socket member and said high voltage transformer housing, and said lamp socket member and said high voltage transformer are embedded in a filler contained in said main igniter circuit housing.

27. A discharge lamp lighting unit according to claim 16 further comprising a deactivating means for deactivating said igniter circuit when said discharge lamp is not installed.

28. A discharge lamp lighting unit according to claim 27 wherein said deactivating means is provided in said lamp socket member.

29. A discharge lamp lighting unit according to claim 16 wherein said case has a mounting member for mounting said discharge lamp lighting unit to a discharge lamp reflector or barrel.

\* \* \* \* \*

UNITED STATES PATENT AND TRADEMARK OFFICE
CERTIFICATE OF CORRECTION

PATENT NO. : 6,066,921
DATED : May 23, 2000
INVENTOR(S) : T. NAKAMURA et al.

It is certified that error appears in the above-identified patent and that said Letters Patent is hereby corrected as shown below:

At column 13, line 47 (claim 2, line 22) of the printed patent, "auxilialy" should be ---auxiliary---.

At column 13, line 45 ( claim 2, line 20) of the printed patent, "deactive" should be ---deactivate---.

Signed and Sealed this

Twenty-second Day of May, 2001

*Attest:*

NICHOLAS P. GODICI

*Attesting Officer*      *Acting Director of the United States Patent and Trademark Office*